(12) United States Patent
Hansen et al.

(10) Patent No.: US 11,571,284 B2
(45) Date of Patent: *Feb. 7, 2023

(54) DENTAL RESTORATION MOLDING TECHNIQUES

(71) Applicant: 3M INNOVATIVE PROPERTIES COMPANY, St. Paul, MN (US)

(72) Inventors: James D. Hansen, White Bear Lake, MN (US); Joseph C. Dingeldein, Blaine, MN (US); Shannon D. Scott, Hudson, WI (US); Joshua K. Schroeder, Hudson, WI (US); Bruce R. Broyles, Oakdale, MN (US); Mary C. Doruff, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 304 days.

This patent is subject to a terminal disclaimer.

(21) Appl. No.: 16/902,644

(22) Filed: Jun. 16, 2020

(65) Prior Publication Data

US 2020/0306016 A1 Oct. 1, 2020

Related U.S. Application Data

(63) Continuation of application No. 15/534,208, filed as application No. PCT/US2015/064195 on Dec. 7, 2015, now Pat. No. 10,722,331.

(Continued)

(51) Int. Cl.
*A61C 13/00* (2006.01)
*A61C 5/77* (2017.01)
(Continued)

(52) U.S. Cl.
CPC ............ *A61C 13/0004* (2013.01); *A61C 5/77* (2017.02); *A61C 13/09* (2013.01); *A61C 13/20* (2013.01); *A61C 13/0001* (2013.01)

(58) Field of Classification Search
CPC ..... A61C 13/0004; A61C 13/20; A61C 13/09; A61C 13/0001; A61C 5/77
(Continued)

(56) References Cited

U.S. PATENT DOCUMENTS

| 613,947 A | 11/1898 | Strout |
|---|---|---|
| 2,090,904 A | 7/1933 | Singer |

(Continued)

FOREIGN PATENT DOCUMENTS

| DE | 10 2009 039 880 | 3/2011 |
|---|---|---|
| DE | 10 2012 108 217 | 12/2013 |

(Continued)

OTHER PUBLICATIONS

"Cavity," Merriam-Webster.com Dictionary, Merriam-Webster, https://www.merriam-webster.com/dictionary/cavity. Accessed Jan. 4, 2021, 14 pages. (2021).

(Continued)

*Primary Examiner* — Matthew M Nelson

(57) ABSTRACT

A custom tool for forming a dental restoration in a mouth of a patient includes a mold body providing for a customized fit with at least one tooth of the patient. The mold body includes a facial portion forming a facial surface corresponding with a facial surface of the tooth, and a separate lingual portion forming a lingual surface corresponding with a lingual surface of the tooth. The mold body is configured to combine with the tooth of the patient to form a mold cavity encompassing missing tooth structure of the tooth.

9 Claims, 13 Drawing Sheets

Related U.S. Application Data

(60) Provisional application No. 62/128,889, filed on Mar. 5, 2015, provisional application No. 62/089,731, filed on Dec. 9, 2014.

(51) Int. Cl.
*A61C 13/09* (2006.01)
*A61C 13/20* (2006.01)
*A61C 13/107* (2006.01)

(58) Field of Classification Search
USPC .......................................................... 433/213
See application file for complete search history.

(56) References Cited

U.S. PATENT DOCUMENTS

| | | | |
|---|---|---|---|
| 2,674,801 A | 4/1954 | Trangmar | |
| 3,224,050 A | 12/1965 | Redtenbacher | |
| 3,482,314 A | 12/1969 | Tofflemire | |
| 4,368,040 A | 1/1983 | Weissman | |
| 4,433,959 A | 2/1984 | Faunce | |
| 4,695,254 A * | 9/1987 | Herrell | A61C 13/30 433/213 |
| 4,704,087 A | 11/1987 | Dragan | |
| 4,713,005 A | 12/1987 | Marshall | |
| 4,775,320 A * | 10/1988 | Marshall | A61C 13/0006 433/180 |
| 4,775,430 A | 10/1988 | Tanaka | |
| 4,778,386 A * | 10/1988 | Spiry | A61C 13/0001 433/45 |
| 4,881,898 A * | 11/1989 | Harvey, Sr. | A61C 5/00 433/214 |
| 5,192,207 A | 3/1993 | Rosellini | |
| 5,195,889 A | 3/1993 | Von Weissenfluh | |
| 5,332,390 A * | 7/1994 | Rosellini | A61C 5/77 433/222.1 |
| 5,382,160 A | 1/1995 | Shemet | |
| 5,487,663 A * | 1/1996 | Wilson | A61C 5/73 433/223 |
| 5,803,734 A * | 9/1998 | Knutson | A61C 5/82 433/136 |
| 5,890,896 A | 4/1999 | Padial | |
| 6,482,314 B1 | 11/2002 | Khare | |
| 6,659,772 B2 | 12/2003 | Margeas | |
| 6,776,614 B2 | 8/2004 | Weichmann | |
| 6,821,462 B2 | 11/2004 | Schulman | |
| 6,845,175 B2 | 1/2005 | Kopelman | |
| 7,027,642 B2 | 4/2006 | Rubbert | |
| 7,056,115 B2 | 6/2006 | Phan | |
| 7,092,780 B2 | 8/2006 | Ganley | |
| 7,162,321 B2 | 1/2007 | Luthardt | |
| 7,217,131 B2 * | 5/2007 | Vuillemot | A61C 13/0001 433/37 |
| 7,234,937 B2 | 6/2007 | Sachdeva | |
| 7,236,842 B2 | 6/2007 | Kopelman | |
| 7,442,040 B2 | 10/2008 | Kuo | |
| 7,605,817 B2 | 10/2009 | Zhang | |
| 7,689,310 B2 | 3/2010 | Kopelman | |
| 7,731,495 B2 | 6/2010 | Eisenberg | |
| 7,801,632 B2 | 9/2010 | Orth | |
| 7,956,862 B2 | 6/2011 | Zhang | |
| 8,194,067 B2 | 6/2012 | Raby | |
| 8,255,071 B2 | 8/2012 | Kaigler, Sr. | |
| 8,308,478 B2 | 11/2012 | Primus | |
| 8,359,114 B2 | 1/2013 | Steingart | |
| 8,366,445 B2 | 2/2013 | Vuillemot | |
| 8,393,897 B2 | 3/2013 | Clark | |
| 8,491,306 B2 | 7/2013 | Raby | |
| 8,527,079 B2 | 9/2013 | Kim | |
| 8,696,356 B2 | 4/2014 | Hegyi | |
| 8,753,114 B2 | 6/2014 | Vuillemot | |
| 8,794,965 B2 | 8/2014 | Latiolais | |
| 8,882,497 B2 | 11/2014 | Frantz | |
| 8,909,363 B2 | 12/2014 | Kopelman | |
| 9,308,058 B2 | 4/2016 | Clark | |
| 9,375,290 B2 | 6/2016 | Csapo | |
| 9,414,895 B2 * | 8/2016 | Clark | A61C 5/85 |
| 10,080,629 B2 | 9/2018 | McDonald | |
| 10,327,873 B2 | 6/2019 | Fisker | |
| 2003/0039943 A1 * | 2/2003 | Worthington | A61C 13/26 433/218 |
| 2003/0170593 A1 * | 9/2003 | Dorfman | A61C 5/30 433/226 |
| 2004/0029068 A1 | 2/2004 | Sachdeva | |
| 2005/0042577 A1 * | 2/2005 | Kvitrud | A61C 5/77 433/218 |
| 2005/0089813 A1 | 4/2005 | Slone | |
| 2005/0089814 A1 | 4/2005 | Slone | |
| 2006/0008777 A1 | 1/2006 | Peterson | |
| 2006/0122719 A1 * | 6/2006 | Kopelman | A61C 5/77 700/118 |
| 2008/0153069 A1 * | 6/2008 | Holzner | A61C 13/20 433/223 |
| 2009/0104581 A1 | 4/2009 | Simon | |
| 2010/0159412 A1 | 6/2010 | Moss | |
| 2011/0212420 A1 * | 9/2011 | Vuillemot | A61C 13/206 433/215 |
| 2012/0029018 A1 | 2/2012 | Lee | |
| 2013/0130202 A1 * | 5/2013 | Vuillemot | A61C 13/0003 433/213 |
| 2013/0325431 A1 | 12/2013 | See | |
| 2014/0205967 A1 * | 7/2014 | Csapo | A61C 5/77 433/214 |
| 2015/0057782 A1 | 2/2015 | Kopelman | |
| 2015/0140517 A1 | 5/2015 | Vuillemot | |
| 2015/0182301 A1 | 7/2015 | Hegland | |
| 2015/0250568 A1 | 9/2015 | Fisker | |
| 2016/0015246 A1 | 1/2016 | Clausen | |
| 2016/0089220 A1 | 3/2016 | Ebert | |
| 2016/0143717 A1 | 5/2016 | Samrano | |
| 2016/0262860 A1 | 9/2016 | Korten | |
| 2017/0119499 A1 | 5/2017 | Clark | |
| 2018/0021113 A1 * | 1/2018 | Hansen | A61C 13/0004 433/213 |
| 2018/0280116 A1 * | 10/2018 | Hansen | A61C 5/77 |
| 2018/0360577 A1 * | 12/2018 | Hansen | A61C 13/081 |
| 2019/0083208 A1 | 3/2019 | Hansen | |
| 2019/0201165 A1 | 7/2019 | Mishaeloff | |
| 2019/0298489 A1 | 10/2019 | Dingeldein | |

FOREIGN PATENT DOCUMENTS

| | | |
|---|---|---|
| EP | 2 400 914 | 8/2018 |
| FR | 2500294 | 8/1982 |
| JP | 2008-119225 | 5/2008 |
| JP | 2014-171698 | 9/2014 |
| WO | WO 2007-084727 | 7/2007 |
| WO | WO 2009/010543 | 1/2009 |
| WO | WO 2009-042378 | 4/2009 |
| WO | WO 2009-158231 | 12/2009 |
| WO | WO 2011-041193 | 4/2011 |
| WO | WO 2011/156806 | 12/2011 |
| WO | WO 2016/046308 | 3/2016 |
| WO | WO 2016/066552 | 5/2016 |
| WO | WO 2016/094272 | 6/2016 |
| WO | WO 2016/095272 | 6/2016 |
| WO | WO 2017-106419 | 6/2017 |
| WO | WO 2017-106431 | 6/2017 |
| WO | WO 2018/022616 | 2/2018 |
| WO | WO 2018/022617 | 2/2018 |
| WO | WO 2020/033528 | 2/2020 |
| WO | WO 2020/033532 | 2/2020 |
| WO | WO 202005885 | 3/2020 |

OTHER PUBLICATIONS

"Bite-perf: the art of occlusal duplication", [retrieved form the internet on Aug. 8, 2017], URL <www.biteperf.es>, 2pgs.
"Bite-perf: Training kit (English)", youtube, [retrieved form the internet on Aug. 8, 2017], URL <http://www.youtube.com/watch?v=tCw45t_ntrA>, 1pg.

(56) References Cited

OTHER PUBLICATIONS

3M Oral Care lecture, 2015, 16pgs_.
Conte, "A Clear PVS Matrix Technique for the Placement of Posterior Direct Composites", Dentistry Today, Apr. 30, 2008, 5pgs.
International Search Report for PCT International Application No. PCT/US2015/064195, dated Mar. 7, 2016, 6pgs.

* cited by examiner

DENTAL RESTORATION MOLDING TECHNIQUES

TECHNICAL FIELD

This disclosure relates to dental restorations.

BACKGROUND

A dental restoration, or a dental filling, utilizes a dental restorative material used to improve function, integrity and morphology of missing or irregular tooth structure. For example, a dental restoration may be used to restore missing tooth structure following external trauma or as part of a restorative treatment for dental caries, or tooth decay.

Restorative dentistry traditionally consists of drilling decay from an infected tooth (commonly referred to as "preparing" the tooth) and then using simple tools and a high level of craftsmanship to isolate, retract, fill and contour the finished restoration. Quality isolation via a rubber dam is cumbersome and often skipped for less effective isolation via cotton roles—increasing the risk of contamination which reduces longevity of the restoration. Retraction of soft and hard tissue includes manipulation of cords, wedges and matrix bands, and imperfect technique may result in contamination, residual flash in proximal areas, and poorly adapted contacts.

While 'bulk fill' restorative materials and high intensity curing lights facilitate relatively fast filling of deep cavities (e.g., 4-5 mm), many restorations are completed in a single shade as practitioners may be uncertain of the correct layering protocol for multiple shades or types of restorative material. Last, with little geometrical guidance available on a prepared tooth, creation of the final filling level and occlusal surface geometry may include overfilling with dental restorative material, followed by an iterative process of grinding and checking tooth contact and biting function on an anesthetized patient. This process may be the most time consuming for dental restorations and errors here may result in tooth sensitivity and return visits for adjustment.

SUMMARY

This disclosure relates to dental restoration techniques incorporating the molding of dental restorative material directly on a tooth located within the mouth of a patient. Disclosed techniques include methods for dental restoration, custom tools used for dental restoration and techniques for producing custom tools for dental restoration. Disclosed techniques include tools providing mold cavities customized for an individual patient. In some examples, such custom tools may be produced using 3D printing techniques.

In one example, this disclosure is directed to a custom tool for forming a dental restoration in a mouth of a patient. The mold body provides for a customized fit with at least one tooth of the patient. The mold body includes a facial portion forming a facial surface corresponding with a facial surface of the tooth, and further includes a separate lingual portion forming a lingual surface corresponding with a lingual surface of the tooth. The mold body is configured to combine with the tooth of the patient to form a mold cavity encompassing missing tooth structure of the tooth.

In a further example, this disclosure is directed to a kit including the custom tool and a dental restorative material.

In another example, this disclosure is directed to a method for forming a dental restoration in a mouth of a patient comprising positioning a mold over a portion of a tooth of the patient. The mold combines with the tooth to form a mold cavity encompassing missing tooth structure of the tooth. The method further comprises injecting a dental restorative material within the mold cavity, allowing the dental restorative material to cure within the mold cavity to reform the tooth, and removing the mold from the tooth of the patient.

In an additional example, this disclosure is directed to a method for forming a dental restoration in a mouth of a patient comprising placing dental restorative material onto a portion of a tooth of the patient and positioning a mold over the portion of the tooth. The mold combines with the tooth to form a mold cavity encompassing missing tooth structure of the tooth. The method further includes allowing the dental restorative material to cure within the mold cavity to reform the tooth, and removing the mold from the tooth of the patient.

In another example, this disclosure is directed to a process of making a custom tool for forming a dental restoration of a tooth within a mouth of a patient, the process comprising, obtaining three dimensional scan data of a patient's mouth, and three-dimensionally printing a custom tool for forming the dental restoration of the tooth based on the three dimensional scan data of the mouth of the patient. The custom tool is configured to combine with the tooth of the patient to form a mold cavity encompassing missing tooth structure of the tooth.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS SHOWING SOME EXAMPLES OF THIS DISCLOSURE

DETAILED DESCRIPTION

While conventional dental restoration techniques often include iterative steps and benefit from significant practitioner skill and experience, this disclosure includes techniques that may utilize custom molds to facilitate forming dental restorations within the mouth of a patient more precisely and quickly than generally possible using conventional dental restoration techniques.

Disclosed techniques include capturing a three dimensional dentition of a patient with an intraoral scanner. The custom tool for a dental restoration may include a mold based on the three dimensional (3D) dentition of the patient. The disclosed techniques may facilitate high quality dental restorations with reduced time and skill requirements as compared to conventional dental restoration techniques.

Figure 1:
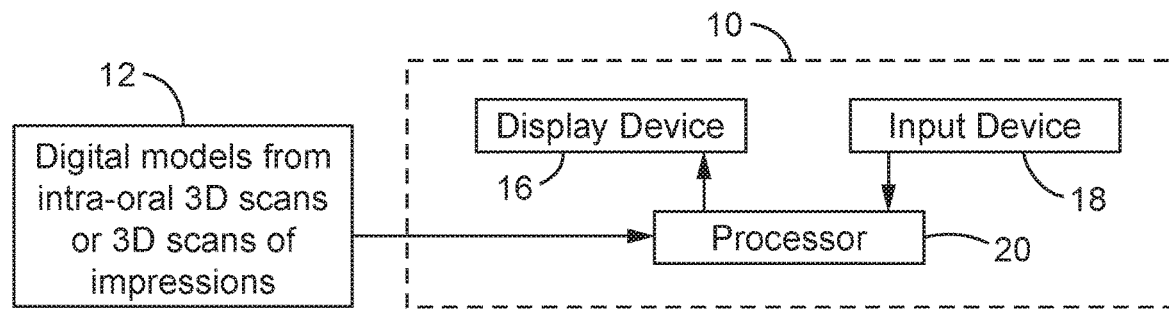
FIG. 1 is a diagram of a system for detecting and defining missing tooth structure using a digital 3D model based upon intra-oral scans, scans of impressions, or scans of models.

FIG. 1 is a diagram of a system 10 for detecting and defining tooth structure using a digital 3D model based upon intra-oral 3D scans or 3D scans of impressions or models of teeth. System 10 includes a processor 20 receiving digital 3D models of teeth (12) from intra-oral scans or scans of impressions of teeth. System 10 can also include an electronic display device 16, such as a liquid crystal display (LCD) device, for displaying indications of changes in tooth shape and an input device 18 for receiving user commands or other information. Systems to generate digital 3D images or models based upon image sets from multiple views are disclosed in U.S. Pat. Nos. 7,956,862 and 7,605,817, both of which are incorporated by reference herein. These systems can use an intra-oral scanner to obtain digital images from multiple views of teeth or other intra-oral structures, and those digital images are processed to generate a digital 3D model representing the scanned teeth. System 10 can be implemented with, for example, a desktop, notebook, or tablet computer. System 10 can receive the 3D scans locally or remotely via a network, such a local area network (LAN) and/or the Internet.

Figure 2:
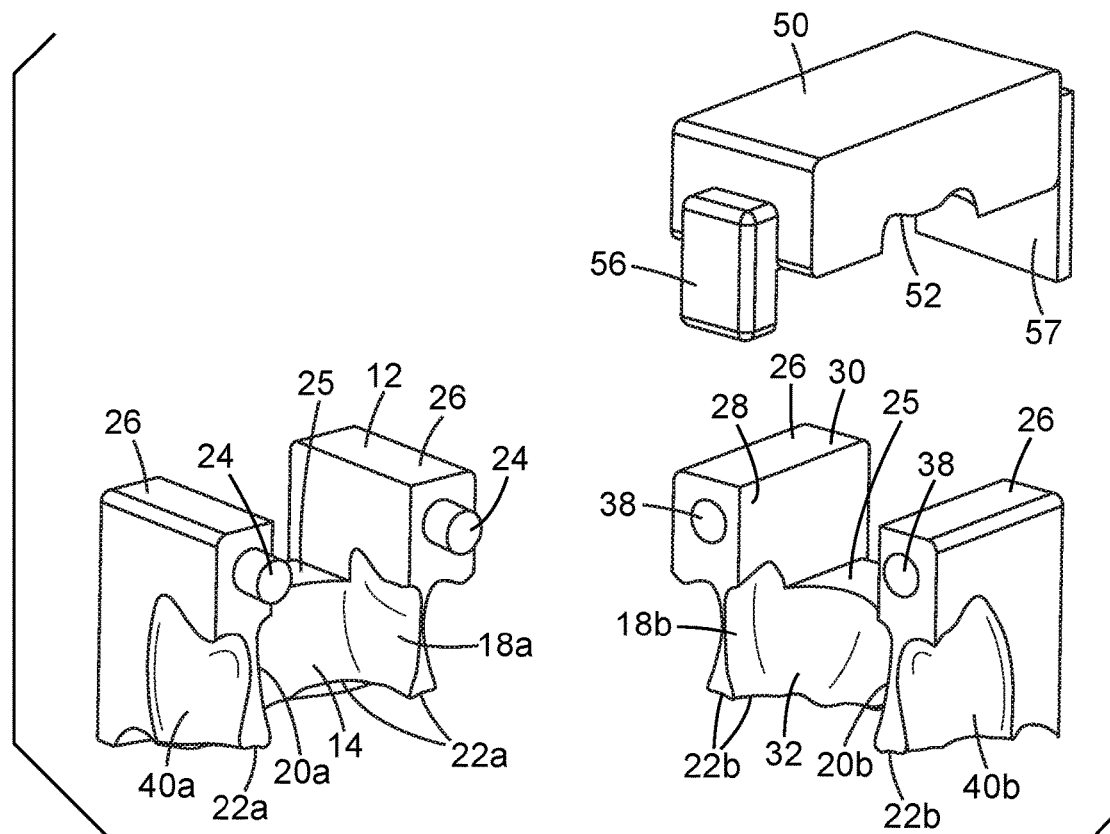
FIGS. 2 and 3 illustrate components of a custom tool for forming a dental restoration in a mouth of a patient with a mold body including a lingual portion and a facial portion that snap-fit together, and a slidable occlusal portion.
Figure 3:
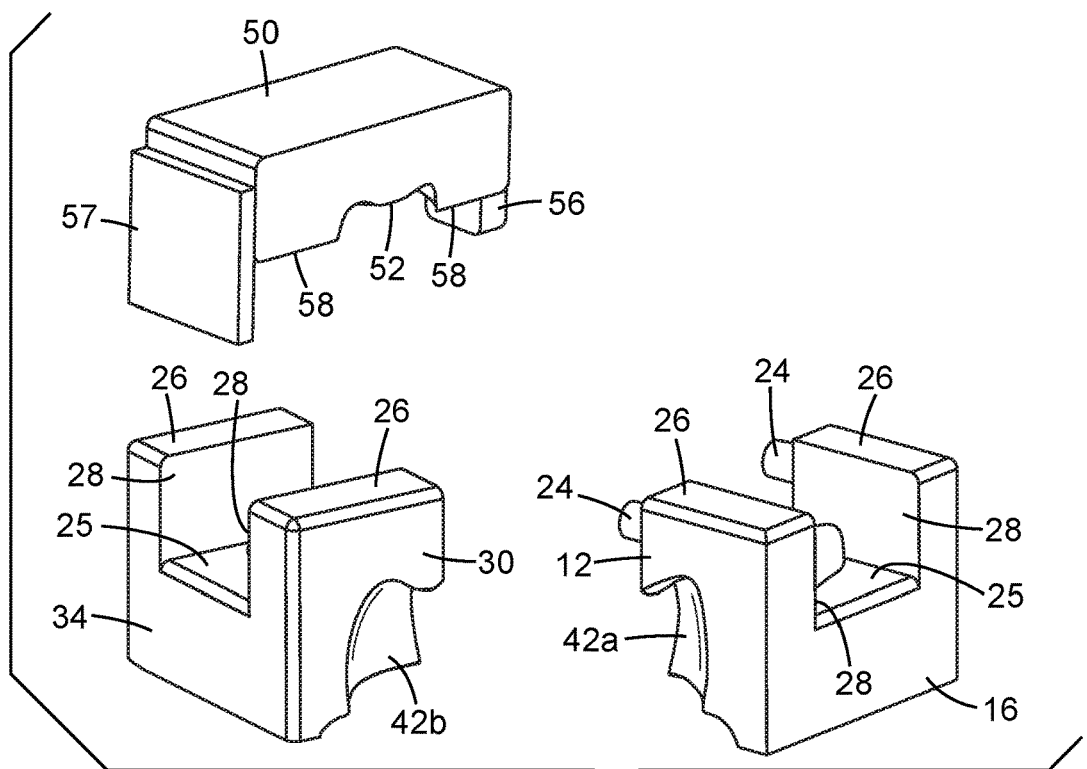
Figure 4:
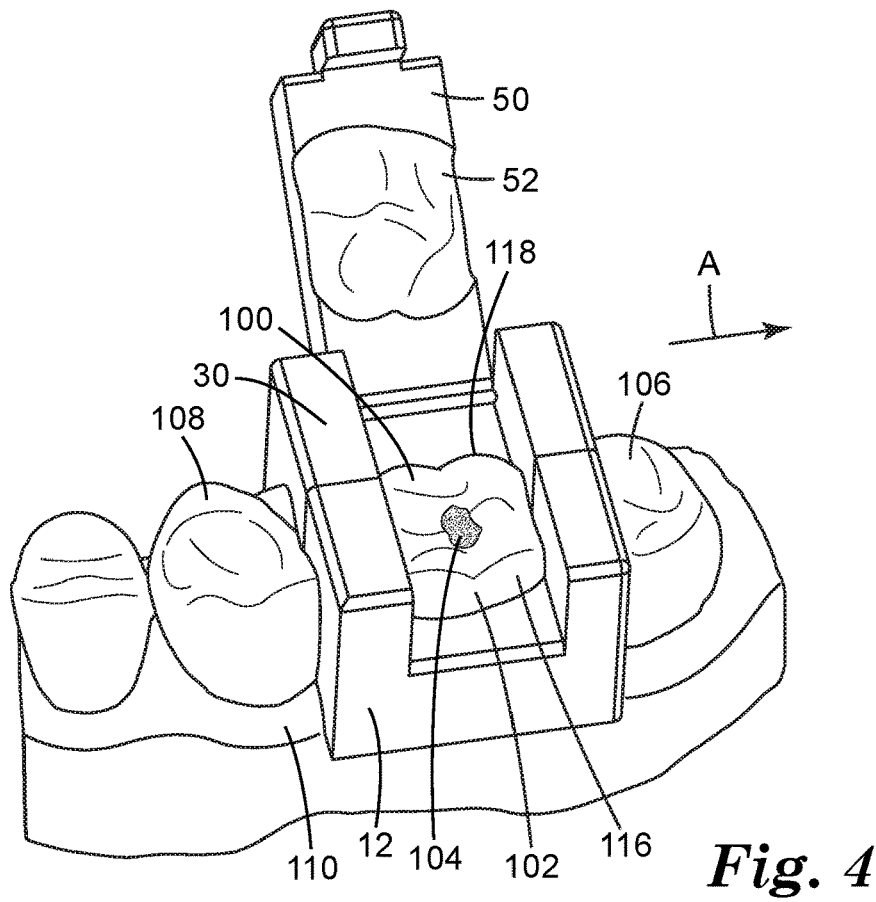
FIGS. 4-6 illustrate a custom tool for forming a dental restoration in a mouth of a patient with a mold body including a lingual portion and a facial portion that snap-fit together, and a hinged occlusal portion.
Figure 5:
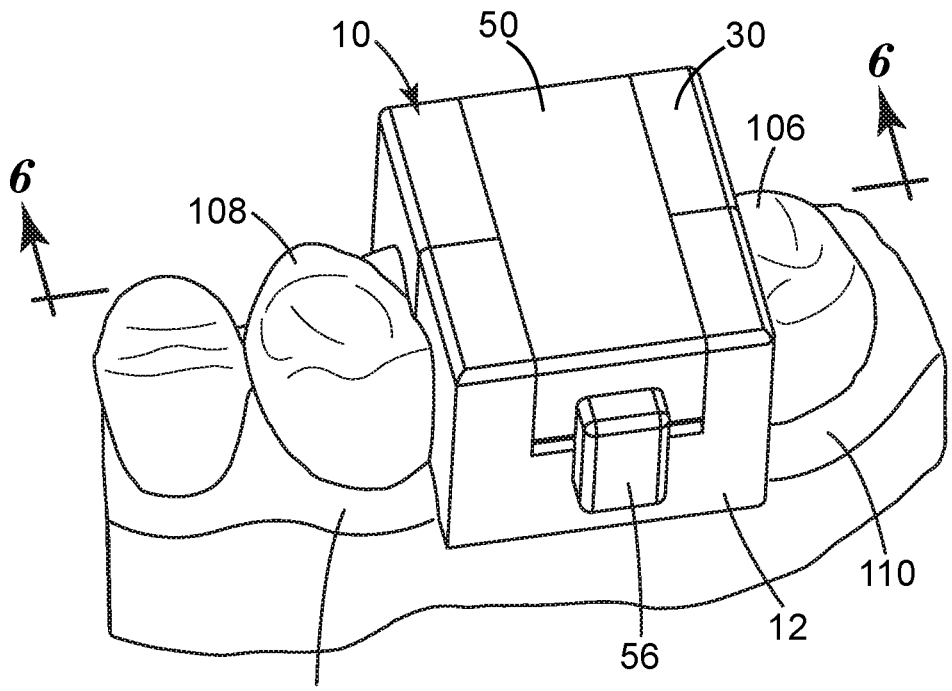
Figure 6:
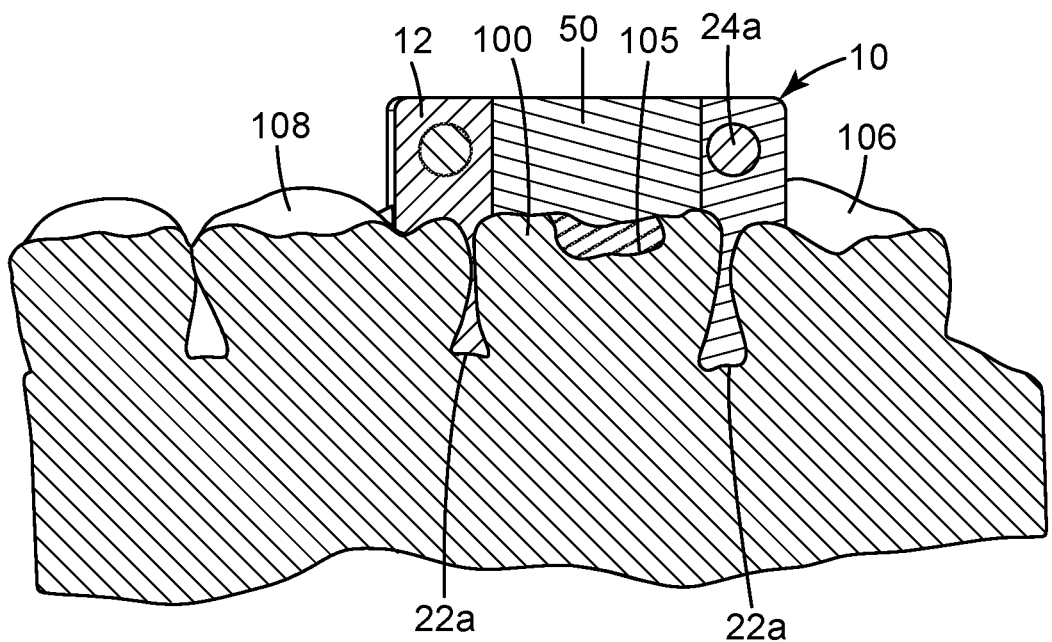
Figure 7:
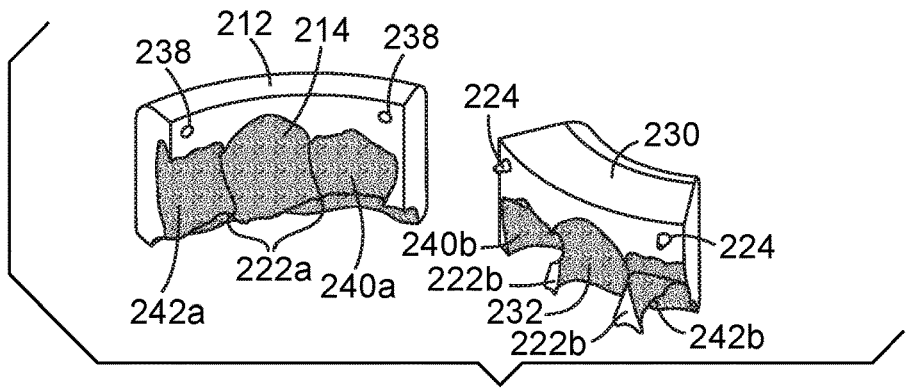
FIGS. 7-10 illustrate a custom tool for forming a dental restoration in a mouth of a patient with a mold body including a lingual portion and a facial portion that snap-fit together and combine to form an occlusal surface of the mold.

FIGS. 2 and 3 illustrate components of a custom tool for forming a dental restoration in a mouth of a patient. The custom tool of FIGS. 2 and 3 comprises a mold body including a lingual portion 30 and facial portion 12 that snap-fit together, as well as slidable occlusal portion 50. More specifically, lingual portion 30 forms recesses 38 that are configured to receive protrusions 24 of facial portion 12 to create the snap-fit connection between facial portion 12 and lingual portion 30. In addition, facial portion 12 and lingual portion 30 may be further held together by slidable occlusal portion 50, including tabs 56, 57, or alternatively, tab 56 and a hinge element (as shown in FIGS. 4-6).

Facial portion 12 and lingual portion 30 are configured to surround a tooth of a patient. In particular, facial portion 12 forms customized facial surface 14 of the tooth whereas lingual portion 30 forms customized lingual surface 32 of the tooth. In addition, facial portion 12 and lingual portion 30 form customized distal surfaces 18a and 18b, respectively, corresponding to surfaces of the tooth, as well as customized mesial surfaces 20a and 20b, respectively, corresponding to mesial surfaces of the tooth. Similarly, occlusal portion 50 forms occlusal surface 52, corresponding to occlusal surfaces of the tooth. Facial portion 12 and lingual portion 30 also contain customized gingival surfaces 22a and 22b, respectively, which seal against the corresponding gingival surfaces within the mouth of the patient.

The mold body, which includes, facial portion 12, lingual portion 30 and occlusal portion 50 combines with the tooth, not shown, to form a mold cavity. The mold cavity encompasses missing tooth structure of the tooth, for example tooth structure removed when preparing a tooth to remove a carious lesion (or caries) to form cavity 104 (FIG. 4) suitable for receiving dental restorative material. By positioning the custom tool over the tooth, dental restorative material may be positioned into the mold to take the form of the missing tooth structure of cavity 104

Facial portion 12 and lingual portion 30 each form portions of top surface 26 of the custom tool as well as inside side surface 28 and inside receiving surface 25, which are configured to accept slidable occlusal portion 50 of the mold body. Occlusal portion 50 forms bottom surface 58, which is configured to register with inside receiving surface 25. Occlusal portion 50 further forms tab 56, which is configured to register with outer surface 16 of facial portion 12, and tab 57, which is configured to register with outer surface 34 of lingual portion 30. Occlusal portion 50, including tabs 56 and 57, may serve to hold facial portion 12 and lingual portion 30 together when surrounding the tooth of the patient.

Facial portion 12 and lingual portion 30 are also configured to register with adjacent teeth within the mouth of the patient to facilitate precise placement within the mouth of the patient. In particular, facial portion 12 and lingual portion 30 form customized mesial surfaces 40a and 40b, respectively, corresponding to mesial surfaces of the distally adjacent tooth. Facial portion 12 and lingual portion 30 also form customized distal surfaces 42a and 42b, respectively, corresponding to distal surfaces of the mesially adjacent tooth.

FIGS. 4-6 illustrate custom tool 10. Custom tool 10 is substantially similar to the custom tool of FIGS. 2 and 3 except that occlusal portion 50 includes a hinged connection to lingual portion 30 rather than a slidable connection. For brevity, features already discussed with respect to the custom tool of FIGS. 2 and 3 are not repeated in detail with respect to custom tool 10.

FIGS. 4-6 further illustrate custom tool 10 in combination with teeth 100, 106, 108 within the mouth of a patient. The mouth of the patient further includes gingiva 110. Tooth 100 includes crown 102 with cavity 104. As shown, cavity 104 may have been a carious lesion in tooth 100 previously prepared by drilling or other preparation to remove damaged dental material. Facial portion 12 encompasses facial surface 116 of tooth 100, whereas lingual portion 30 encompasses lingual surface 118 of tooth 100. Custom tool 10 facilities dental restoration of tooth 100 including restoration surrounding cavity 104.

Custom tool 10 may be formed based on a digital model of the teeth and mouth of a patient, which can be produced an intra-oral 3D scan, such as a multi-channel scanner (e.g., TRUE DEFINITION SCANNER, commercially available from 3M Company, Saint Paul, Minn.). Methods of capturing the digital model dentition include, intraoral scanning or scanning a physical dental impression, or scan a model poured from a physical dental impression. Minimally, the scan includes a target area of a tooth to be restored. The scan may additionally include one or more of the target area, complete tooth to be restored, adjacent teeth, surrounding soft tissue, opposing dentition and bite registration. Data may be captured during routine checkups, at the time a cavity is diagnosed, or during the restorative procedure. The captured data may by modified by trimming, error correction and hole filling. Additional dataset(s) such as opposing dention, 2D or 3D x-ray data of internal or subgingival features and non-patient specific standard root data may be used to augment the captured data.

In one particular example, custom tool 10 may be digitally designed using CAD software, such as solid modeling software based on the digital model. For example, fixed, parametric, or libraries of tool blank forms may be created in CAD software (e.g. Solidworks, NX/Unigraphics, Pro-Engineer, etc). These objects are typically exported into a separate 3D virtual work environment capable of managing point cloud or triangular mesh data and capable to performing Boolean operations (e.g. Materialise Magics, SpaceClaim). Optionally, the standard forms are scaled to assure a proper fit between the standard part and the patients' dentition. The patient data may then be subtracted from the standard form. As an alternative approach to Boolean subtraction, the tool design may be cut from a virtual shell built onto the target tooth structure.

Custom tool 10 was designed to fit over tooth 100, the tooth to be restored (a first molar), as well as a portions of the adjacent teeth 106, 108. The shape of occlusal surface 52 may correspond to the shape of crown 102 prior to the preparation of cavity 104. In some other examples, the shape of occlusal surface 52 may correspond to the contact surfaces of the opposing tooth to identify missing tooth structure corresponding to cavity 104 of crown 102. In other examples, the shape of occlusal surface 52 may be derived from a projected shape by smoothing or flattening the digital model of the surface adjacent to cavity 104. Alternatively or additionally, the occlusal surface may be derived from occlusal surfaces not subject to the restoration (e.g., using the mirror image occlusal surface of the other first molar in the same arch or designing on the basis of opposing dentition). Alternatively or additionally, the occlusal surface may be constructed to achieve desired therapeutic benefit, such as opening of the bite, or to optimize occlusion. Software useful in such design include Lava Design from 3M Company, Saint Paul, Minn., 3 Shape CAD Design, available from 3 Shape of Copenhagen, Denmark, or exocad, available from exocad GMBH of Darmstadt, Germany. In any event, to design the components of custom tool 10, a virtual mold block may be created over the digital model and segmented into the mold components, in this example, facial portion 12, lingual portion 30 and occlusal portion 50. The precise location of one or more elements of custom tool 10 may be selected on the basis of the digital model to, e.g., facilitate assembly of the components within the mouth of the patient and/or to ensure access to a mold cavity with an injection port or a vent. Such customly-located elements may include a parting line, an injection port, a vent, a gate, and/or a boundary line between components. In this manner, the mold components facilitate eventual assembly of custom tool 10 on tooth 100 without geometric interference.

The design of tool 10 may optionally be tested and/or optimized in a virtual environment that simulates its function in the mouth, such as a virtual articulator. The mold tool or form is segmented along parting lines to relieve undercuts where material compliance is insufficient for release, or to define volumes for the creation of varying material property transitions or gradients.

In the examples, of FIGS. 4-6 occlusal portion 50 is attached to lingual portion 30 via a hinged connection. In contrast, in FIGS. 2 and 3, occlusal portion 50 was configured to be slideably received by facial portion 12 and lingual portion 30. In any event, the components within the CAD software may be converted into a 3D point mesh file or other format to facilitate production with a 3D printer, CNC mill or otherwise. The tool designs are then exported to a device capable of fabricating 3D objects, such as a CNC mill or a wide range of additive manufacturing/3D printing equipment. Parts may be treated with agents to improve surface finish or release. The manufactured parts are then used in the dental procedure. They may be printed locally or they may be sent as part of a procedure kit, which includes adhesives, dental restorative material and other consumables for the procedure. In some examples, the dental restorative material is provided in the dental capsule including a cannula adapter to fit with a port on the custom tool.

In some specific examples, the components of custom tool 10, were printed on an Object Connex500 using VeroWhite, VeroBlack, Tango+, TangoBlack, as well as in metered blends of VeroWhite and Tango+. Objects could also optionally be printed using VeroClear, or on a 3D Systems SLA Viper si$^2$ using Accura 60 or Clearview. VeroBlack represents a rigid material and TangoBlack an elastomeric material, both of which block actinic radiation. Accura 60, Veroclear, and VeroWhite represent rigid materials, and Tango+ an elastomeric material, all of which transmit actinic radiation. Tango+ can also be blended with rigid "Vero family" materials to achieve intermediate durometers. The deformability of the elastomeric materials allows for improved compliance as well as improved release mechanics. The material may optionally be selected to facilitate curing of a dental restoration material within a mold cavity of the custom tool 10.

Production may optionally include other steps such as, curing, e.g., in a UV chamber, cleaning, e.g., in alcohol solution, polishing, coating and/or assembly of various components, such as assembly of the hinged portion of occlusal portion 50 to lingual portion 30. The printed custom tool 10 can be pressed into uncured dental restorative material to form occlusal anatomy. Optionally engineered fracture lines may be included in custom tool 10 to help facilitate removal of custom tool 10 from the mouth of the patient.

The completed tool 10 may be used to perform dental restoration of tooth 100 including restoration of cavity 104. First, lingual portion 30 and the facial (buccal) portion 12 may be within the mouth of a patient such that these components encompassed the tooth 100 isolate, separate or retract oral tissue, although tool 100 may optionally be place in combination with other equipment such as a matrix band. In this example, cavity 104 may be filled with a dental restorative material, such as, FILTEK Supreme Ultra Universal Restorative, available from 3M of Saint Paul, Minn., with an amount slightly exceeding the cavity volume of cavity 104. Occlusal portion 50 may be closed via rotation about the hinge and fully seated, thus transferring the details of occlusal surface 52 to the dental restorative material 105 (FIG. 6) within cavity 104. In this manner, occlusal surface 52 of occlusal portion 50 combines with tooth 100 to form a mold cavity encompassing missing tooth structure (corresponding to cavity 104) of tooth 100.

Excess restorative dental material may be expressed through the parting lines of the tool components upon the closure of the hinge. The dental restorative material may be light cured through the tool, such as with an XL 3000 curing light. For example, tool 10 may be formed from a material transmissive to actinic radiation. Alternatively, molds may be filled with freshly mixed chemically curing dental restorative materials, such as 3M Concise Composite Restorative or 3M Ketac Molar glass ionomer filling material, following by sufficient incubation time in the mold to allow complete curing. After curing, the tool components may be removed from the mouth of a patient, and flashed (excess) restorative dental material may be removed with a dental scaler. The restored tooth 100 thus possesses an occlusal surface corresponding to that of occlusal surface 52 of occlusal portion 50. In this manner, intricate surfaces may be easily formed during repair of crown 102 of tooth 100.

In some examples, facial portion 12, lingual portion 30 and occlusal portion 50 may be designed in such a way that their placement forces separation of teeth 100, 106 and/or 108. For example, facial portion 12, lingual portion 30 and occlusal portion 50 may be designed to precisely coincide with the geometries of teeth 100, 106, 108, except that the interproximal extensions of gingival surfaces 22a and 22b (FIG. 6) of facial portion 12 and lingual portion 30 may be slightly wider than the spaces between teeth 100 and 106 and between teeth 100 and 108. For example, the interproximal extensions of gingival surfaces 22a and 22b (FIG. 6) of facial portion 12 and lingual portion 30 may be enlarged in the mesial and distal directions such that placement of facial portion 12 and lingual portion 30 creates outward pressure on one of both of teeth 106, 108 and/or pressure on tooth 100. In this manner, installing facial portion 12 and lingual portion 30 over teeth 100, 106, 108 may force the separation the spaces between teeth 100 and 106 and between teeth 100 and 108.

Figure 8:
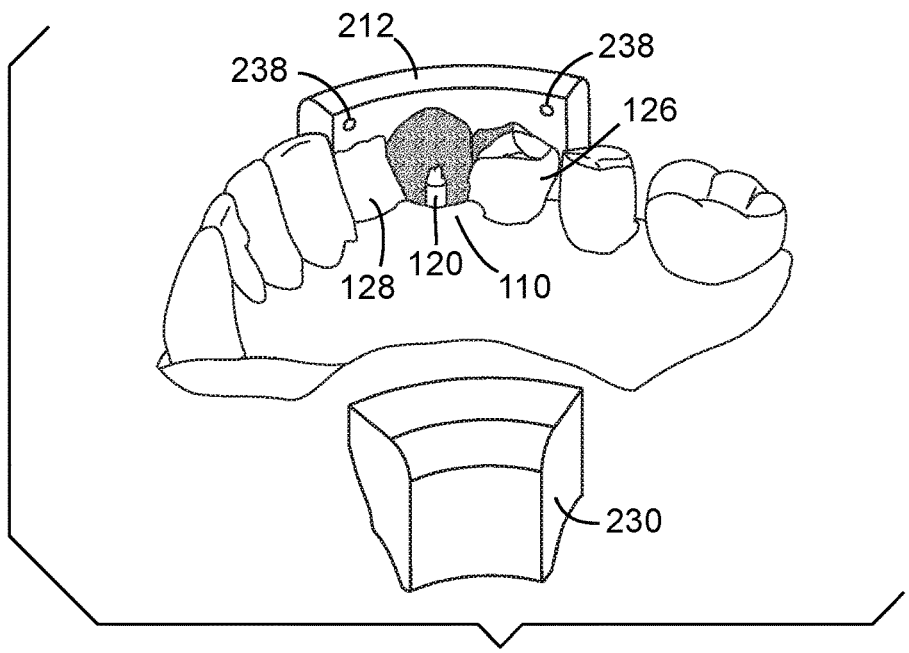
Figure 9:
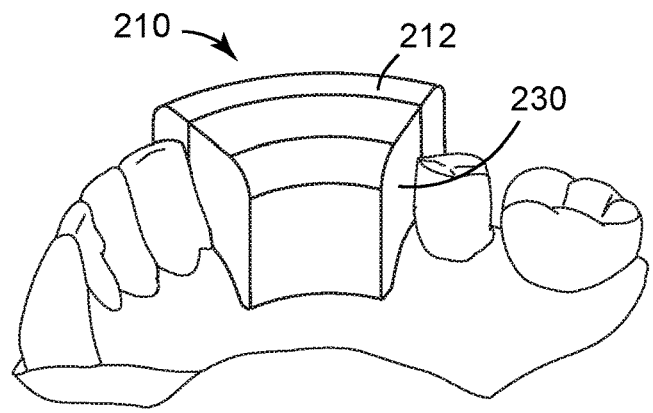

FIGS. 7-10 illustrate custom tool 210 for forming a dental restoration in a mouth of a patient. Custom tool 210 includes a mold body with facial portion 212 and lingual portion 230. Facial portion 212 and lingual portion 230 snap-fit together and combine to define the surfaces of the desired tooth restoration. FIGS. 8 and 9 further illustrate custom tool 210 in combination with teeth 120, 126, 128 within the mouth of a patient. The mouth of the patient further includes gingiva 110. Tooth 120 includes a significant portion of missing tooth material, and may have been ground down to remove decayed material to facilitate dental restoration of the entire exposed surface of tooth 120. In some examples a 3D image of the mouth of the patient (or of a dental impression) may be taken prior to the removal of decayed material from tooth 120 as the shape of the decayed material may help in the design of custom tool 210. In the same or different examples, the shape of the contralateral tooth may be mirrored in software, or a design created in a commercially available crown design software, such as 3 Shape CAD Design, available from 3 Shape of Copenhagen, Denmark, or exocad, available from exocad GMBH of Darmstadt, Germany.

Facial portion 212 forms recesses 238 that are configured to receive protrusions 224 of lingual portion 230 to create the snap-fit connection between facial portion 212 and lingual portion 230.

Facial portion 212 and lingual portion 230 are configured to surround a tooth of a patient. In particular, facial portion 212 forms customized facial surface 214 of the tooth whereas lingual portion 230 forms customized lingual surface 232 of the tooth. Customized facial surface 214 and customized lingual surface 232 include customized proximal surfaces, corresponding to proximal surfaces of the tooth, as well as customized incisal surfaces, corresponding to incisal surfaces of the tooth. Facial portion 212 and lingual portion 230 also form customized gingival surfaces 222a and 222b, respectively, corresponding to gingival surfaces within the mouth of the patient.

The mold body, which includes, facial portion 212 and lingual portion 230 combines with tooth 120, to form a mold cavity. The mold cavity encompasses missing tooth structure of tooth 120. By positioning custom tool 210 over tooth 120, restorative dental material may be positioned into the mold and take the form of the missing tooth structure of tooth 120. In some examples, restorative dental material may be placed on tooth 120 prior to assembling custom tool 210 over tooth 120. In the same or different examples, restorative dental material may be placed on surface 214 of facial portion 212 and/or surface 232 of lingual portion 230 tooth 120 prior to assembling custom tool 210 over tooth 120. In another example, custom tool 210 may be first assembled over tooth 120 and then restorative dental material may be injected into the mold cavity. For example, one or both of facial portion 212 and lingual portion 230 may include a port configured to receive an injection of restorative dental material once custom tool 210 is positioned over tooth 120 to form the mold cavity.

Facial portion 212 and lingual portion 230 are also each configured to register with adjacent teeth within the mouth of the patient to facilitate precise placement within the mouth of the patient. In particular, facial portion 212 and lingual portion 230 form customized surfaces 240a and 240b, respectively, corresponding to the surfaces of the adjacent tooth 126. Facial portion 212 and lingual portion 230 also form customized surfaces 242a and 242b, respectively, corresponding to the surfaces of the adjacent tooth 128. In this manner, facial portion 212 and lingual portion 230 register with teeth 126, 128 to facilitate precise positioning of custom tool 210 within the mouth of the patient for reconstruction of tooth 120.

Figure 10:
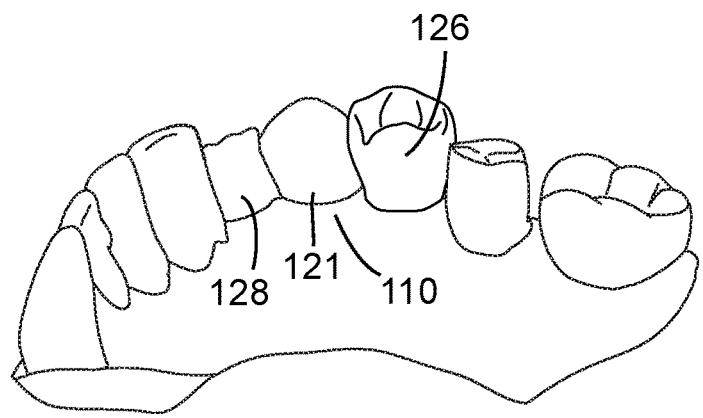
Figure 11:
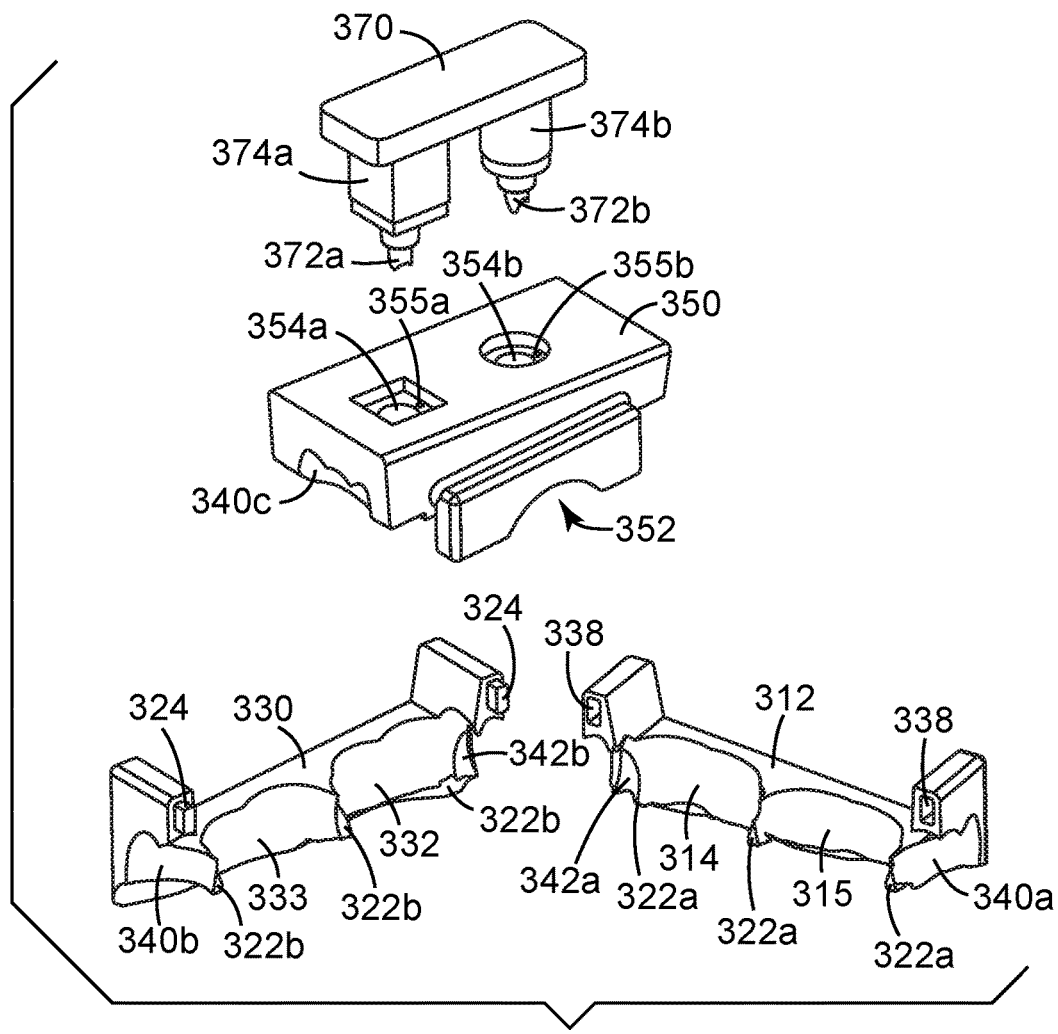
FIGS. 11-14 illustrate a custom tool for forming a dental restorations of two adjacent teeth in a mouth of a patient with a mold body including a lingual portion and a facial portion that snap-fit together and a slidable occlusal portion, the slidable occlusal portion including injection ports for delivery of dental restorative material to the mold cavities of the custom tool.

Custom tool 210 facilitates the dental restoration of more than one tooth at the same time. As shown in FIG. 8, like tooth 120, tooth 126 also includes missing tooth material on the crown of tooth 126. Custom tool 210 facilities reconstruction of tooth 126 coincident with the reconstruction of tooth 120. Positioning custom tool 210 over tooth 120 and tooth 126 further forms a second mold cavity representing the missing tooth material on the crown of tooth 126. As described with respect to tooth 120, restorative dental material may be placed within the mold cavity adjacent to tooth 126 in order to facilitate the reconstruction of tooth 126. For example, custom tool 210 may include a second port configured to receive an injection of restorative dental material once custom tool 210 is positioned over tooth 120 to form the mold cavity adjacent to tooth 126. FIG. 10 illustrates repaired tooth 121 and teeth 126, 128 within the mouth of a patient following the repair with custom tool 210.

Custom tool 210 may be formed in a similar matter to that previously described with respect to custom tool 10. For brevity, aspects of the design and manufacture of custom tool 210 that are already described with respect to custom tool 10 are not repeated in detail.

A crown preparation was cut on a patient requiring restoration of their lower right cuspid, tooth 120. The prepared crown and neighboring dentition was captured by a full arch digital impression. The digital impression was imported into CAD software and the image of the lower left cuspid was mirrored to form the target restoration shape for the lower right cuspid, tooth 120. The target restoration shape was virtually placed on the crown preparation in the software environment to form the target design for the restored arch. A mold form was digitally designed in software to encompass the lower right archform, including the lower right cuspid needing restoration, tooth 120, and the adjacent teeth 126, 128. An optional filling port was digitally subtracted from the cuspid section of the mold form, located in a section of the tooth to be filled in the restoration process. The filling port was located in facial portion 212 and was sized to receive a tip of a commercially available restorative dental material compule, to permit injection of the restorative dental material within the mold cavity for tooth 120. A parting line to split the mold form into the facial portion 212 (labial) and lingual portion 230 was determined and alignment features 224, 238 were placed on the two portions 212, 230 to facilitate precise and secure assembly of the physical tool components during the later process of restoring the tooth.

The components within the CAD software, representing facial portion 212 and lingual portion 230, may be converted into a 3D point mesh file or other format to facilitate production with a 3D printer, CNC mill, or otherwise. Production may optionally include other steps such as, curing (e.g., in a UV chamber), cleaning, e.g., in alcohol solution.

FIGS. 11-14 illustrate custom tool 310 for forming a dental restorations of two adjacent teeth 100, 101 in a mouth of a patient with a mold body. The mold body includes lingual portion 312 and facial portion 330 that snap-fit together and a slidable occlusal portion 350. Slidable occlusal portion 350 includes injection ports 354a, 354b for delivery of dental restorative material to the mold cavities of custom tool 310, which correspond to teeth 100, 101.

Figure 12:
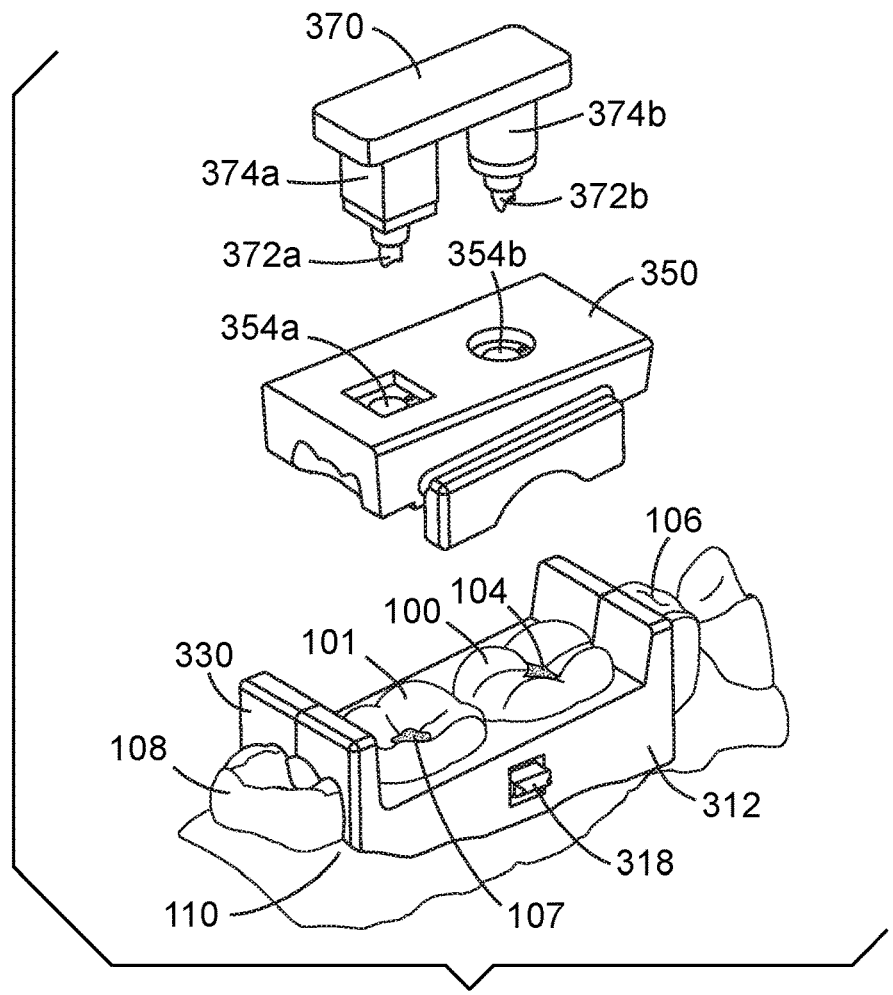
Figure 13:
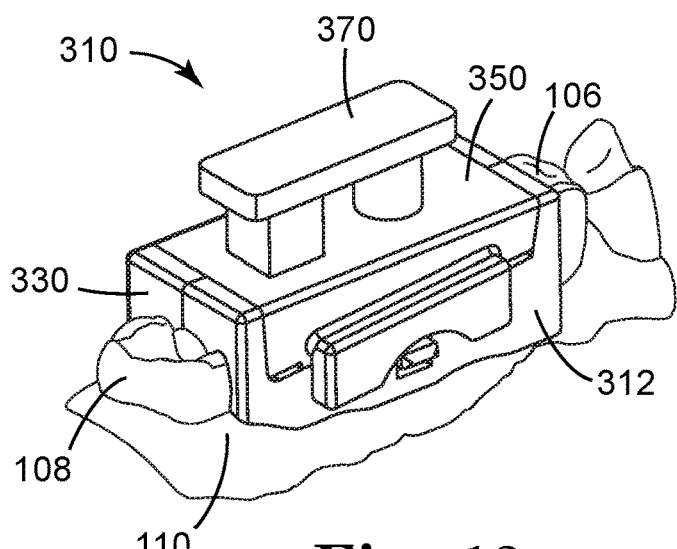

FIGS. 12 and 13 further illustrate custom tool 310 in combination with teeth 100, 101, 106, 108 within the mouth of a patient. The mouth of the patient further includes gingiva 110. Tooth 100 includes cavity 104 in the crown of tooth 100, and tooth 101 includes cavity 107 in the crown of tooth 101. As shown, cavities 104, 107 may have been caries previously prepared by drilling or other preparation to remove damaged dental material to facilitate dental restoration using tool 310. In some examples a 3D image of the mouth of the patient may be taken prior to the removal of decayed material from teeth 100, 101 as the shape of the decayed material may help in the design of custom tool 310.

Lingual portion 312 and facial portion 330 are configured to surround teeth 100, 101. In particular, lingual portion 312 forms customized lingual surfaces 314, 315, whereas facial portion 330 forms customized facial surfaces 332, 333. In addition, customized lingual surfaces 314, 315 and customized facial surfaces 332, 333 include customized proximal surfaces, corresponding to proximal surfaces of teeth 100, 101. Lingual portion 312 and facial portion 330 also form customized gingival surfaces 322a and 322b, respectively, corresponding to gingival surfaces within the mouth of the patient.

Optionally, lingual portion 312 and facial portion 330 may be further configured to provide features, including customized gingival surfaces 322a and 322b representing an isolation matrix for a dental restoration. In this manner, lingual portion 312 and facial portion 330 may contain features that extend subgingivally or into hidden interproximal space. The data for these extensions can be based off of anatomical averages, or patient x-ray data. The tool may incorporate elastomeric material which can be designed for an undersized fit to create a tight seal against varying actual geometry of the patient's dentition. The materials used may also vary in hydrophillicity to draw water, saliva, and other fluids away from the tooth structure being restored. Microfluidic channels, vacuum line attachments and bite blocks can be incorporated as well.

Occlusal portion 350 provides customized occlusal surfaces 352, corresponding to occlusal surfaces of teeth 100, 101. Lingual portion 312 and facial portion 330 configured to accept slidable occlusal portion 350 of the mold body.

Lingual portion 312, facial portion 330 and occlusal portion 350 are also configured to register with adjacent teeth 106, 108 within the mouth of the patient to facilitate precise placement within the mouth of the patient. In particular, lingual portion 312, facial portion 330 and occlusal portion 350 form customized mesial proximal surfaces 340a, 340b, 340c respectively, corresponding to mesial surfaces of the distally adjacent tooth 108. Lingual portion 312, facial portion 330 and occlusal portion 350 also form customized distal proximal surfaces 342a, 342b, (distal proximal surface of occlusal portion 350 not shown), respectively, corresponding to distal surfaces of the mesially adjacent tooth 106.

The mold body, which includes, lingual portion 312, facial portion 330 and occlusal portion 350 combines with teeth 100, 101 to form two distinct mold cavities. The mold cavities encompass missing tooth structure of teeth 100, 101. By positioning custom tool 310 over teeth 100, 101, restorative dental material may be positioned into the mold cavities and take the form of the missing tooth structure of cavities 104, 107.

Figure 14:
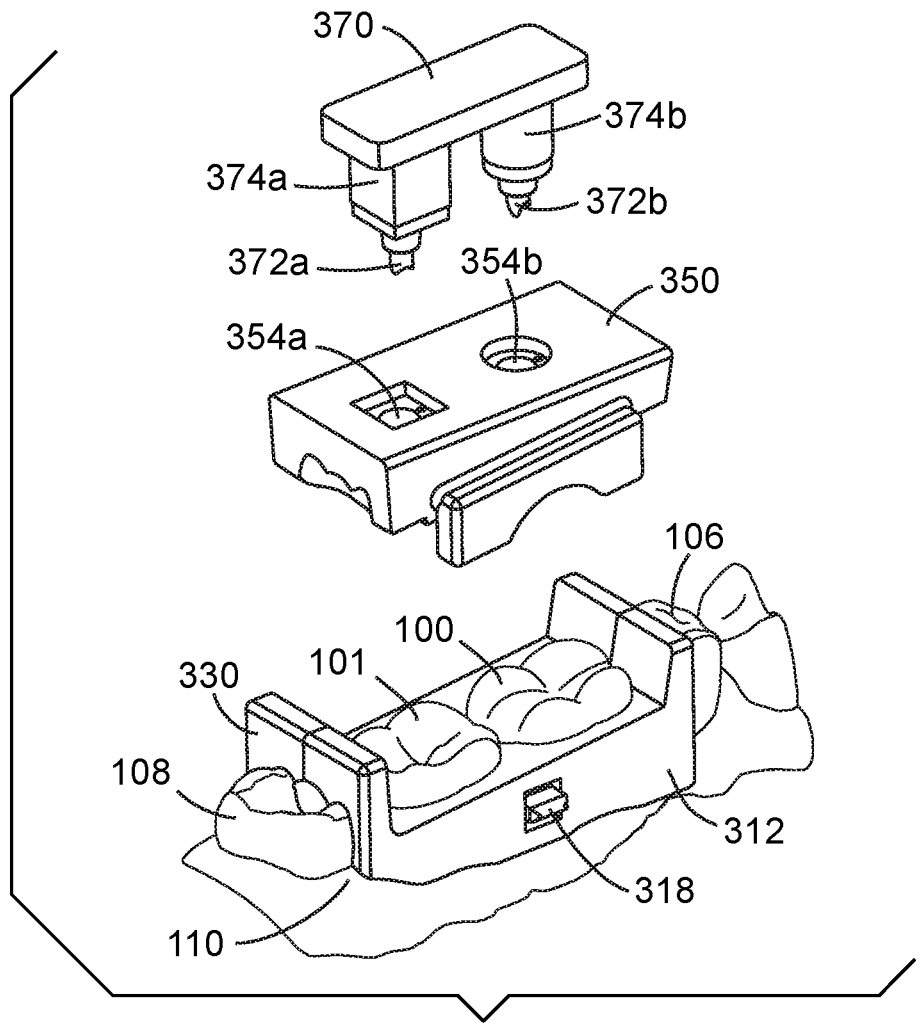
Figure 15:
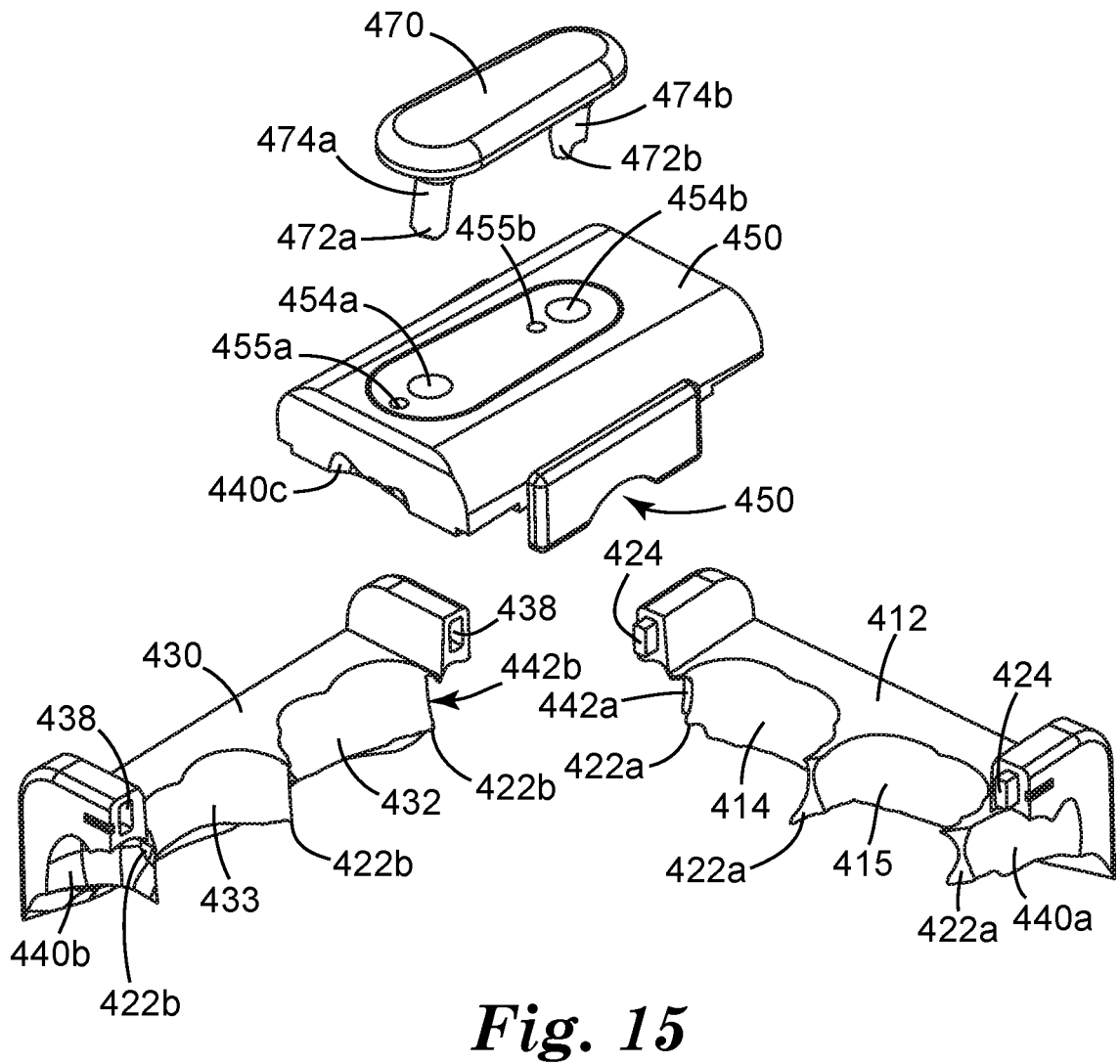
FIGS. 15-18 illustrate a custom tool for forming dental restorations of two adjacent teeth in a mouth of a patient configured to provide separation of adjacent teeth during restoration.

In particular, occlusal portion 350 includes ports 354a, 354b configured to accept injection of a restorative dental material for the mold cavities corresponding to teeth 101, 100, respectively. Following the injection of restorative dental material into the mold cavities of custom tool 310, press 370 may be positioned such that plugs 374a, 374b fill ports 354a, 354b, respectively. Plugs 374a, 374b further includes bottom surfaces 372a, 372b providing defined shapes corresponding to the occlusal surfaces of repaired teeth 101, 100. Plugs 374a, 374b have dissimilar shapes (square, round) to prevent misalignment of press 370 relative to occlusal portion 350. Occlusal portion 350 further includes vent holes 355a, 355b to allow air and excess dental material to escape the mold cavities as material is injected via fill ports 354a, 354b and as press 370 is positioned such that such that plugs 374a, 374b fill ports 354a, 354b, respectively. FIG. 14 illustrates repaired teeth 101, 100 within the mouth of a patient following the repair with custom tool 310.

Custom tool 310 may be formed in a similar matter to that previously described with respect to custom tool 10 and custom tool 210. For brevity, aspects of the design and manufacture of custom tool 310 that are already described with respect to custom tool 10 are not repeated in detail.

Custom tool 310 may be formed based on a digital model of the teeth and mouth of a patient, which can be produced an intra-oral 3D scan, such as a multi-channel scanner. In one particular example, custom tool 310 may be digitally designed using CAD software, such as solid modeling software based on the digital model. Custom tool 310 was designed to fit over teeth 100, 101 (adjacent first and second molars) and a portion of the neighboring teeth 106, 108. Subsequently, the tooth structure of teeth 100, 101, 106, 108 may be digitally subtracted the from a mold block, as were filling and venting ports (354a, 354b, 355a, 355b). Alternatively, an inverse of the tooth structure may be inverted within software to define the mold block. The ports may be located in regions of the occlusal section which correspond to regions of the teeth which would ultimately be removed in the preparation process, e.g., adjacent to the mold cavities of teeth 100, 101. Filling ports 354a, 354b may be sized to receive a tip of a commercially available restorative dental material compule, to permit injection of the restorative dental material during filling. Vent ports 355a, 355b may be sized smaller in diameter than the filling ports.

The mold block design may be segmented into three sections (lingual portion 312, facial portion 330 and occlusal portion 350) to facilitate eventual assembly of the tool components on the teeth without geometric interference. Alternatively, additional segments may be provided such that portions of the mold for teeth 100, 101 may be separated such that each of lingual portion 312, facial portion 330 and occlusal portion 350 are divided into two or more components. The occlusal section was designed into the mold block such that it was bounded on the mesial and distal sides to assist with alignment of the occlusal section on the facial (buccal)—lingual assembly. Handle features (318) may be included added to lingual portion 312 and facial portion 330 to facilitate holding of the portions with a hemostat or cotton pliers during placement of the tool.

The occlusal section may include tabs or sliders on the lingual and facial (buccal) side to provide precise alignment to the lingual and labial sections. An additional piece, a handle section, was designed to mate with the occlusal section as well as plug the filling ports 354a, 354b, in such a manner that the plug tips surfaces 372a, 372b, may be at, or slightly occlusal to, the desired occlusal surface of the restoration of teeth 100, 101.

The components within the CAD software may be converted into a 3D point mesh file or other format to facilitate production with a 3D printer, CNC mill, or otherwise. Orientation marks (e.g., a colored mark on the distal ends of each tool component) may be applied to the tool components to facilitate assembly. Production may optionally include other steps such as, curing (e.g., in a UV oven), cleaning, e.g., in alcohol solution, and/or assembly of various components, polishing of tooth surfaces, coating, such as with a clear acrylic to enhance visibility of the restoration area during injection of the restorative dental material. In addition, surfaces of tool components expected to be in contact with the restorative dental material could optionally be coated with a layer of release agent (e.g., a thin layer of petroleum jelly).

An example restoration process for teeth 100, 101 using custom tool 310 is described as follows. Matrix bands were trimmed so that their occlusal-gingival heights would be slightly above the height of the facial (buccal) and lingual portions after placement. The matrix bands were placed in the interproximal space where tooth structure of the first and second molars, teeth 100, 101, had been removed. The lingual portion 312 and facial portion 330 were assembled over teeth 100, 101 to assist with isolation and to secure the matrix bands in the proper positions (and to aid in adapting the shape of the matrix bands to the contours of the teeth 100, 101). Because the tooth preparations may prepared at a depth greater than the recommended maximum cure depth for the restorative dental material, a base layer of restorative dental material can optionally be layered into the deep portions of the preparation and dental restorative material photocured with an XL 3000 curing light. The occlusal portion 350 may be placed prior to adding a final increment of restorative dental material via ports 354a, 354b. The final increment of restorative dental material was then formed to the desired anatomy by injecting the restorative dental material via compule tip through the filling ports 354a, 354b while visually monitoring the filling process through the tool and at the vent ports 355a, 355b. After filling, the removable press 370 was mated with occlusal portion 350. The final increment of restorative dental material for both teeth 100, 101 may be photocured through tool 310, with the occlusal portion 350 and the removable press 370 in place. After curing, tool 310 was removed from the mouth of the patient and matrix bands removed to provide a shaped restoration including well-formed contacts. If needed, flashed (excess) restorative dental material may be removed, for example, with a dental scalar.

FIGS. 15-18 illustrate custom tool 410 for forming a dental restorations of two adjacent teeth 100, 101 in a mouth of a patient configured to provide separation of adjacent teeth 100, 101, 106, 108 during restoration. Custom tool 410 includes a mold body with facial portion 430 and lingual portion 412 that snap-fit together and a slidable occlusal portion 450. Slidable occlusal portion 450 includes injection ports 454a, 454b for delivery of dental restorative material to the mold cavities of custom tool 410, which correspond to teeth 100, 101.

Custom tool 410 is substantially similar to custom tool 310 with the exception that the geometries of lingual portion 312, facial portion 330 and occlusal portion 350 have been designed to provide separation of adjacent teeth 100, 101, 106, 108 during restoration rather than to exactly conform to the positions of teeth 100, 101, 106, 108 within the mouth of the patient. In this manner, custom tool 410 may facilitate separation of teeth without the use of separate matrix bands or wedges as described with respect to custom tool 310 or as typically practiced in the conventional direct restorative process.

Figure 16:
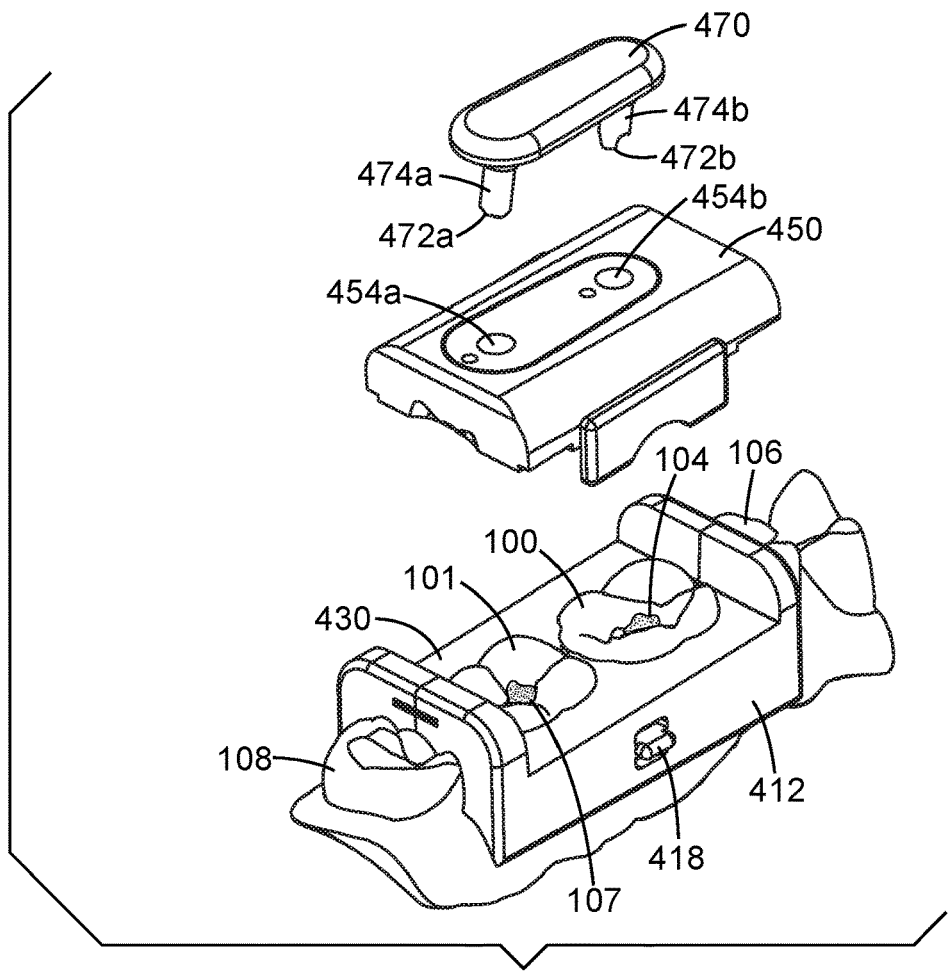
Figure 17:
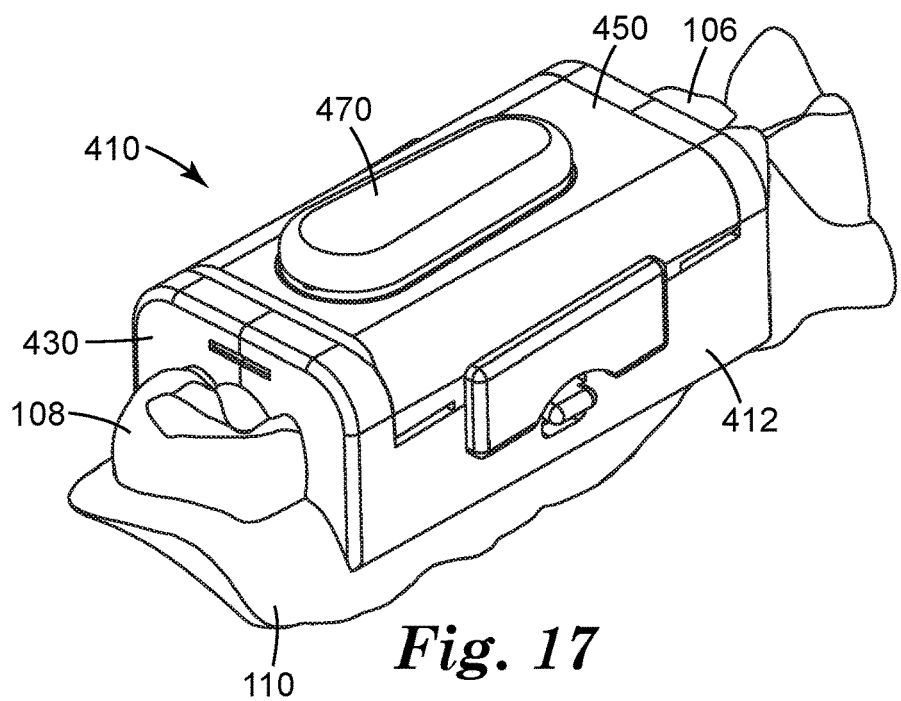

FIGS. 16 and 17 further illustrate custom tool 410 in combination with teeth 100, 101, 106, 108 within the mouth of a patient. The mouth of the patient further includes gingiva 110. Tooth 100 includes cavity 104 in the crown of tooth 100, and tooth 101 includes cavity 107 in the crown of tooth 101. As shown, cavities 104, 107 may have been caries previously prepared by drilling or other preparation to remove damaged dental material to facilitate dental restoration using tool 410. In some examples a 3D image of the mouth of the patient may be taken prior to the removal of decayed material from teeth 100, 101 as the shape of the decayed material may help in the design of custom tool 410.

Lingual portion 412 and facial portion 430 are configured to surround teeth 100, 101. In particular, lingual portion 412 forms customized lingual surfaces 414, 415, whereas facial portion 430 forms customized facial surfaces 432, 433. In addition, customized lingual surfaces 414, 415 and customized facial surfaces 432, 433 include customized proximal surfaces, corresponding to proximal surfaces of teeth 100, 101. Lingual portion 412 and facial portion 430 also form customized gingival surfaces 422a and 422b, respectively, corresponding to gingival surfaces within the mouth of the patient.

Optionally, lingual portion 412 and facial portion 430 may be further configured to provide features, including customized gingival surfaces 422a and 422b representing an isolation matrix for a dental restoration. In this manner, lingual portion 412 and facial portion 430 may contain features that extend subgingivally or into hidden interproximal space. The data for these extensions can be based off of anatomical averages, or patient x-ray data. An elastomeric component can be designed for an undersized fit to create a tight seal against varying actual geometry of the patient's dentition. The materials used may also vary in hydrophillicity to draw water and saliva away from the tooth structure being restored. Microfluidic channels, vacuum line attachments and bite blocks can be incorporated as well.

Occlusal portion 450 provides customized occlusal surfaces 452, corresponding to occlusal surfaces of teeth 100, 101. Lingual portion 412 and facial portion 430 configured to accept slidable occlusal portion 450 of the mold body.

Lingual portion 412, facial portion 430 and occlusal portion 450 are also configured to register with adjacent teeth 106, 108 within the mouth of the patient to facilitate precise placement within the mouth of the patient. In particular, lingual portion 412, facial portion 430 and occlusal portion 450 form customized mesial proximal surfaces 440a, 440b, 440c respectively, corresponding to mesial surfaces of the distally adjacent tooth 108. Lingual portion 412, facial portion 430 and occlusal portion 450 also form customized distal proximal surfaces 442a, 442b, (distal proximal surface of occlusal portion 450 not shown), respectively, corresponding to distal surfaces of the mesially adjacent tooth 106.

The mold body, which includes, lingual portion 412, facial portion 430 and occlusal portion 450 combines with teeth 100, 101 to form two distinct mold cavities. The mold cavities encompass missing tooth structure of teeth 100, 101. By positioning custom tool 410 over teeth 100, 101, restorative dental material may be positioned into the mold cavities and take the form of the missing tooth structure of cavities 104, 107.

Figure 18:
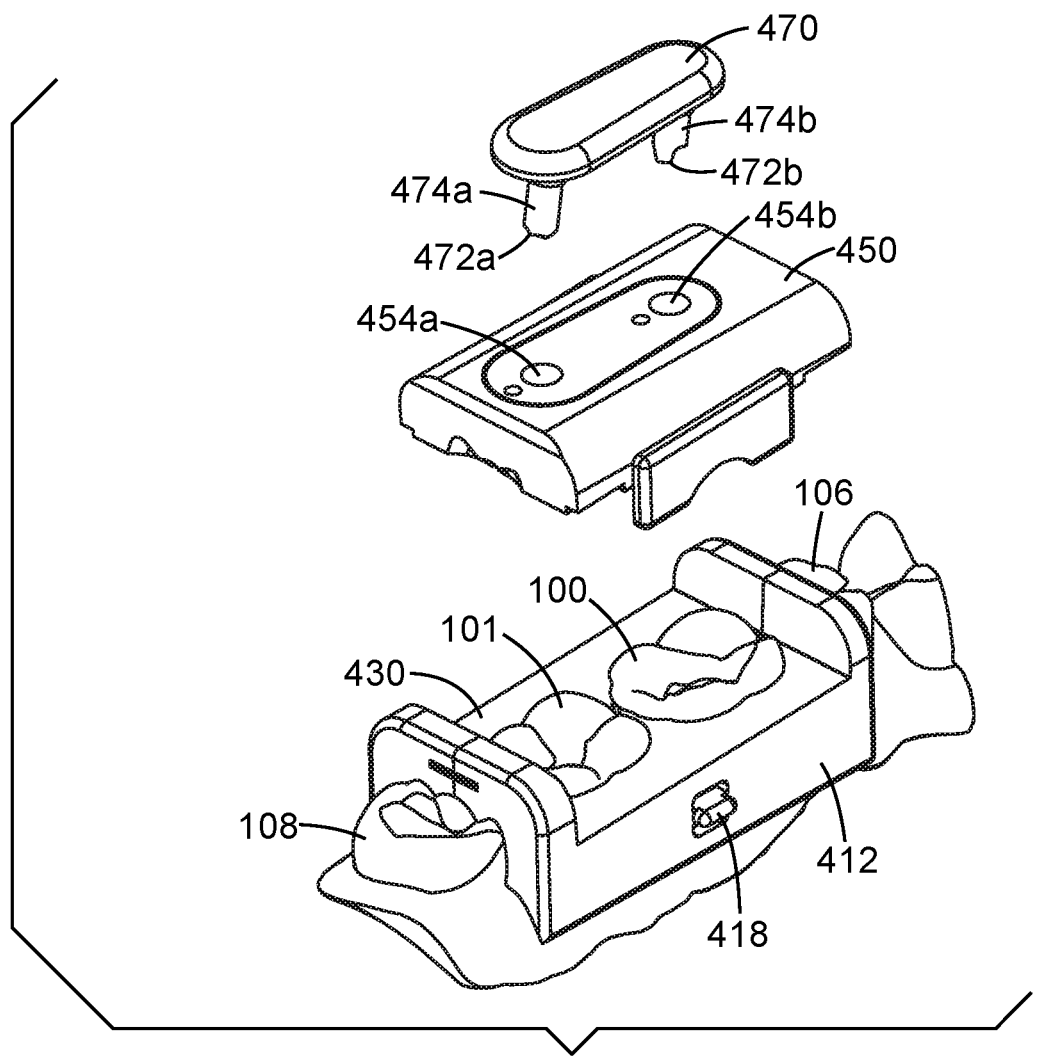
Figure 19:
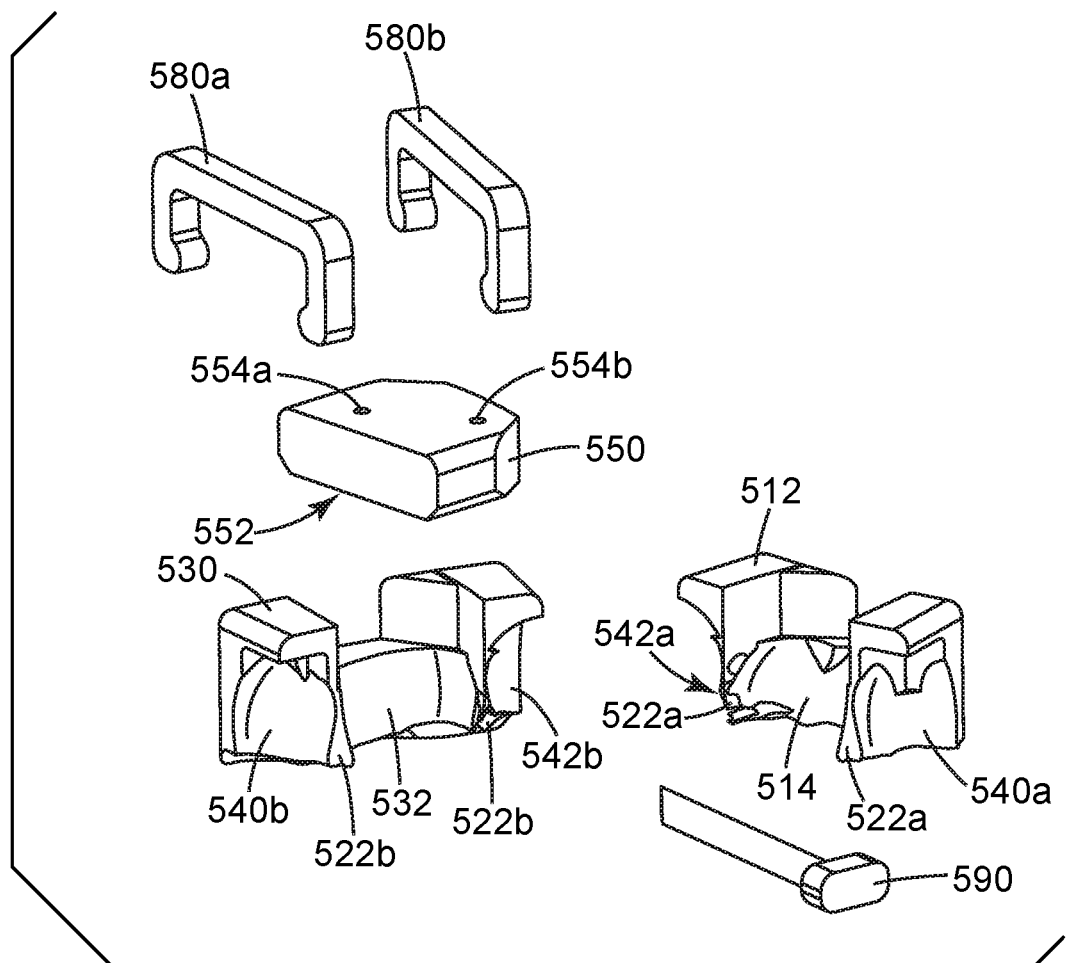
FIGS. 19-22 illustrate a custom tool for forming a dental restoration in a mouth of a patient with a mold body including a lingual portion and a facial portion, clamps that hold the lingual and facial portions together, a slidable occlusal portion and a wedge to facilitate separation of adjacent teeth during restoration.

In particular, occlusal portion 450 includes ports 454a, 454b configured to accept injection of a restorative dental material for the mold cavities corresponding to teeth 101, 100, respectively. Following the injection of restorative dental material into the mold cavities of custom tool 410, press 470 may be positioned such that plugs 474a, 474b fill ports 454a, 454b, respectively. Plugs 474a, 474b further includes bottom surfaces 472a, 472b providing defined shapes corresponding to the occlusal surfaces of repaired teeth 101, 100. Occlusal portion 450 further includes vent holes 455a, 455b to allow air and excess dental material to escape the mold cavities as material is injected via fill ports 454a, 454b and as press 470 is positioned such that such that plugs 474a, 474b fill ports 454a, 454b, respectively. FIG. 18 illustrates repaired teeth 101, 100 within the mouth of a patient following the repair with custom tool 410.

Custom tool 410 may be formed in a similar matter to that previously described with respect to custom tool 10 and custom tool 210. For brevity, aspects of the design and manufacture of custom tool 410 that are already described with respect to custom tool 10 and custom tool 210 are not repeated in detail.

Custom tool 410 may be formed based on a digital model of the teeth and mouth of a patient, which can be produced an intra-oral 3D scan, such as a multi-channel scanner. In one particular example, custom tool 410 may be digitally designed using CAD software, such as solid modeling software based on the digital model. Custom tool 410 was designed to fit over teeth 100, 101 (adjacent first and second molars) and a portion of the neighboring teeth 106, 108. In contrast to custom tool 310, the CAD model of the scan for custom tool 410 was digitally segmented at the proximal planes to be restored and the resulting segments were each translated 100 microns to produce a gap between contacts of teeth 100, 101, 106 and 108. Subsequently, the tooth structure of teeth 100, 101, 106, 108, as modified to include gaps between the teeth, may be digitally subtracted the from a mold block, as were filling and venting ports (454a, 454b, 455a, 455b) The ports may be located in regions of the occlusal section which correspond to regions of the teeth which would ultimately be removed in the preparation process, e.g., adjacent to the cavities of teeth 100, 101. Filling ports 454a, 454b may be sized to receive a tip of a commercially available restorative dental material compule, to permit injection of the restorative dental material during filling. Vent ports 455a, 455b may be sized smaller in diameter than the filling ports.

The mold block design may be segmented into three sections (lingual portion 412, facial portion 430 and occlusal portion 450) to facilitate eventual assembly of the tool components on the teeth. The parting line of lingual portion 412 and facial portion 430 in the interproximal regions was designed at an angle to the arch line. This provides that when the "wedge" portions came in contact, they would be overlapping at the contact area, reducing the risk of material flash during filling. As a secondary measure, the interproximal "wedge" portions of lingual portion 412 and facial portion 430 were digitally extended to create an interference of 500 microns. Due to the finite resolution of the printing device used for manufacturing, there can be a loss in feature fidelity as sizes reduce to zero (as is the case with a wedge, or knife edge). Extending the interproximal "wedge" components may compensate for this "under-printing" seen during physical production.

The occlusal section was designed into the mold block such that it was bounded on the mesial and distal sides to assist with alignment of the occlusal section on the facial (buccal)—lingual assembly. Handle features (418) may be included added to lingual portion 412 and facial portion 430 to facilitate holding of the portions with a hemostat or cotton pliers during placement of the tool.

The occlusal section may include tabs or sliders on the lingual and facial (buccal) side to provide precise alignment to the lingual and labial sections. An additional piece, a handle section, was designed to mate with the occlusal section as well as plug the filling ports 454a, 454b, in such a manner that the plug tips surfaces 472a, 472b, may be at, or slightly occlusal to, the desired occlusal surface of the restoration of teeth 100, 101.

The components within the CAD software may be converted into a 3D point mesh file or other format to facilitate production with a 3D printer, CNC mill or otherwise. Orientation marks (i.e. a colored mark on the distal ends of each tool component) may be applied to the tool components to facilitate assembly. Production may optionally include other steps such as, curing, e.g., in a UV chamber, cleaning, e.g., in alcohol solution, and/or assembly of various components, polishing of tooth surfaces, coating, such as with a clear acrylic to enhance visibility of the restoration area during injection of the restorative dental material. In addition, surfaces of tool components expected to be in contact with the restorative dental material could optionally be coated with a layer of release agent (e.g., a thin layer of petroleum jelly).

An example restoration process for teeth 100, 101 using custom tool 410 is described as follows. The lingual portion 412 and facial portion 430 were assembled over teeth 100, 101 to assist with isolation, to slightly separate the teeth, and to create a matrix between the teeth. Because the tooth preparations may prepared at a depth greater than the recommended maximum cure depth for the restorative dental material, a base layer of restorative dental material can optionally be layered into the deep portions of the preparation and dental restorative material photocured with an XL 3000 curing light. The occlusal portion 450 may be placed prior to adding a final increment of restorative dental material via ports 454a, 454b. The final increment of restorative dental material was then formed to the desired anatomy by injecting the restorative dental material via compule tip through the filling ports 454a, 454b while visually monitoring the filling process through the tool and at the vent ports 455a, 455b. After filling, the removable press 470 was mated with occlusal portion 450. The final increment of restorative dental material for both teeth 100, 101 may be photocured through tool 410, with the occlusal portion 450 and the removable press 470 in place. After curing, tool 410 was removed from the mouth of the patient and matrix bands removed to provide a shaped restoration including well-formed contacts. If needed, flashed (excess) restorative dental material may be removed, for example, with a dental scalar.

Figure 20:
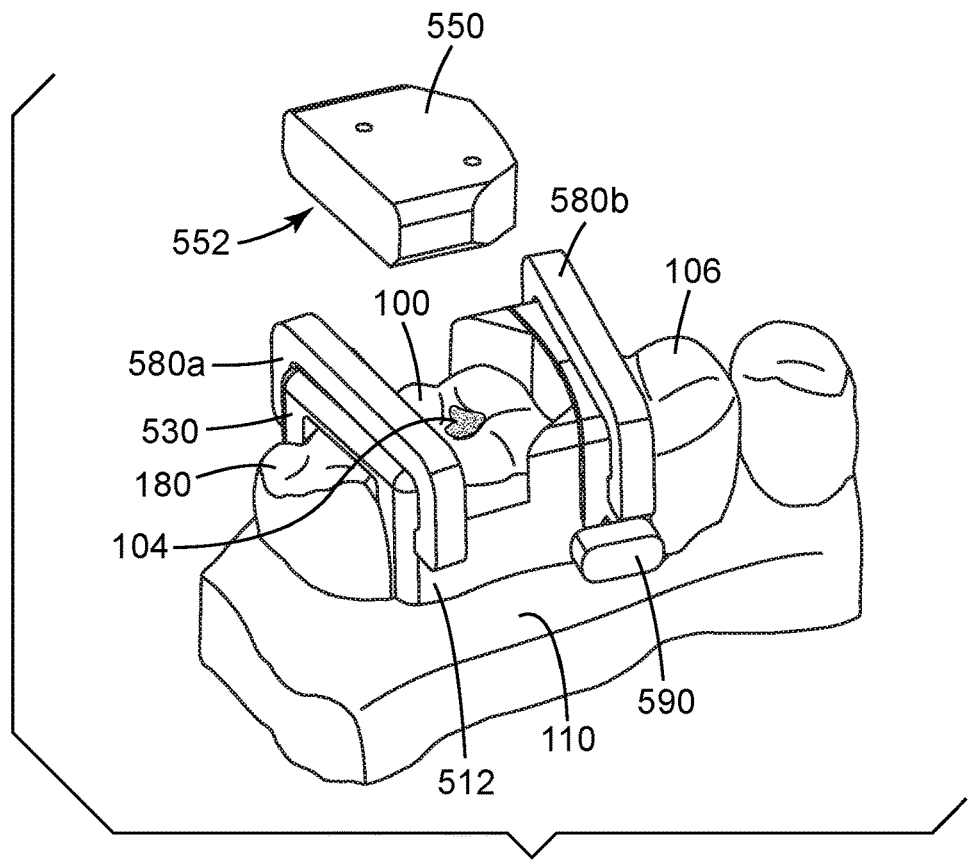
Figure 21:
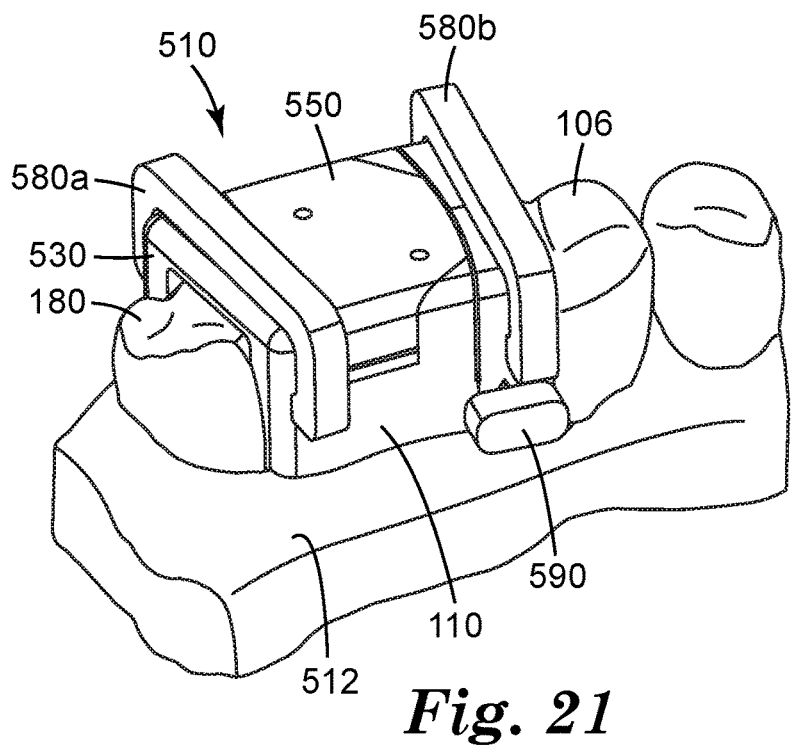

FIGS. 19-22 illustrate custom tool 510 for forming a dental restoration in a mouth of a patient with a mold body including facial portion 530, clamps 580a, 580b that hold the lingual and facial portions together, a slidable occlusal portion 550 and a wedge 590 to facilitate separation of adjacent teeth during restoration. FIGS. 20 and 21 further illustrate custom tool 510 in combination with teeth 100, 106, 108 within the mouth of a patient. Tooth 100 includes cavity 104 in the crown of tooth 100. As shown, cavity 104 may have been a carious lesion in tooth 100 previously prepared by drilling or other preparation to remove damaged dental material to facilitate dental restoration using tool 510. The mouth of the patient further includes gingiva 110. Lingual portion 512 is configured to be secured to facial portion 530 by way of clips 580a, 580b. Lingual portion 512 and facial portion 530 are configured to surround tooth 100 within the mouth of a patient. In particular, lingual portion 512 forms customized facial surface 514 of the tooth whereas facial portion 530 forms customized lingual surface 532 of the tooth.

Customized lingual surface 514 and customized facial surface 532 include customized proximal surfaces, corresponding to proximal surfaces of tooth 100. Lingual portion 512 and facial portion 530 also form customized gingival surfaces 522a and 522b, respectively, corresponding to gingival surfaces 110 within the mouth of the patient. Occlusal portion 550 includes customized occlusal surface 552, corresponding to occlusal surfaces of tooth 100.

The mold body, which includes, lingual portion 512, facial portion 530 and occlusal portion 550 combines with tooth 100 to form a mold cavity. The mold cavity encompasses cavity 104 in the crown of tooth 100. By positioning the custom tool 510 over tooth 100, restorative dental material may be positioned into the mold and take the form of the missing tooth structure of cavity 104.

Figure 22:
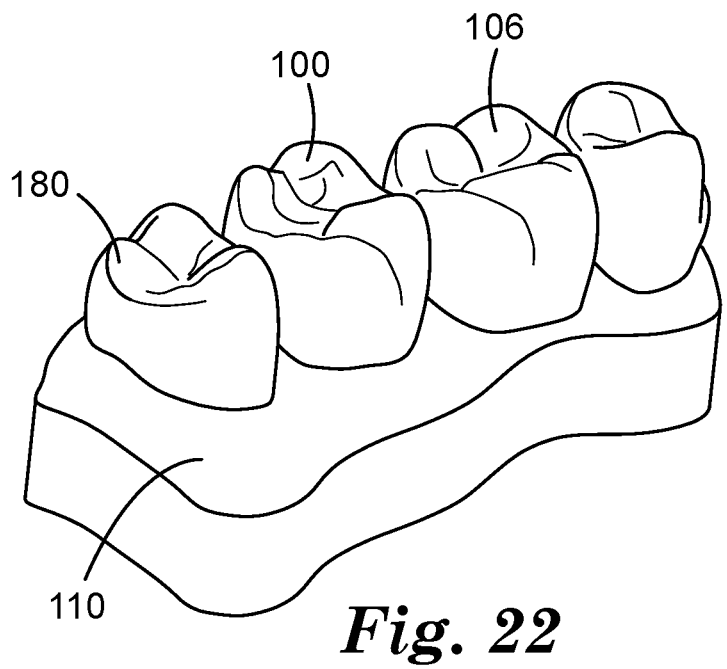

Lingual portion 512 and facial portion 530 are also configured to register with adjacent teeth 106, 108 within the mouth of the patient to facilitate precise placement within the mouth of the patient. In particular, lingual portion 512 and facial portion 530 form customized mesial proximal surfaces 540a and 540b, respectively, corresponding to mesial surfaces of the distally adjacent tooth 108. Lingual portion 512 and facial portion 530 also form customized distal proximal surfaces 542a and 542b, respectively, corresponding to distal surfaces of the mesially adjacent tooth 106. FIG. 22 illustrates repaired tooth 100 as well as tooth 101 within the mouth of a patient following the repair with custom tool 510.

Custom tool 510 may be formed based on a digital model of the teeth and mouth of a patient, which can be produced an intra-oral 3D scan, such as a multi-channel scanner. In one particular example, custom tool 510 may be digitally designed using CAD software, such as solid modeling software based on the digital model. Custom tool 510 was designed to fit over tooth 100, the tooth to be restored (a first molar), as well as a portions of the adjacent teeth 106, 108. To design the components of custom tool 510, a virtual mold block may be created over the digital model and segmented into the mold components, in this example, lingual portion 512, facial portion 530 and occlusal portion 550.

The components within the CAD software may be converted into a 3D point mesh file or other format to facilitate production with a 3D printer, CNC mill or otherwise. Production may optionally include other steps such as, curing, cleaning, polishing, and/or coating with a clear coat and/or release agent as described previously.

The completed tool 510 may be used to perform dental restoration of tooth 100. First a wedge 590 may be inserted in a custom channel to create space between teeth 100, 106 and/or teeth 100, 108, and optionally to help seal the gingival portion of the matrix. Unlike off-the-shelf matrixing systems, the custom design of tool 510 allows for the space creation and sealing aspects to be controlled independently. Optionally, lingual portion 512 and facial portion 530 may be designed with a custom shaped slot that allows a foil or plastic matrix to be inserted from the occlusal to assure a custom shape and flash-free contact point between 100, 106, 108.

The base of the tooth cavity may optionally be coated with liner/adhesive and filled in increments to prevent layers exceeding the allowable thickness for the application of a dental restoration material. The last increment of material may either placed directly on the tooth, into the custom tool 510, or alternatively place injected into an entry port after custom 510 is positioned over tooth 100. The dental restoration material may then be cured. Removal of custom tool 510 can be facilitated by coating custom tool 510 with a release agent (e.g. petroleum jelly, alcohol, silicone, lecithin, etc) prior to placement, by fabricating key sections of the custom tool 510 from peelable or low surface energy materials and/or creating stress concentrators in custom tool 510 that allow it to be broken away.

In another version of the concept, various materials (e.g. shade, mechanical properties) are specified for placement in the cavity. Levels of the various materials are indicated on the custom tools with lines or multiple occlusal caps can be created which form or press each layer to its desired configuration. This features allows any practitioner to create dental restorations with engineered layers for improved appearance and/or function.

In another version of the concept, the restoration design has been modified form the initial scan data such that some surfaces of the optimized design are positioned below the uncut tooth surface. These positions are color coded in the custom tool to indicate to that user at try-in that these areas must be excavated prior to filling the tooth.

Figure 23:
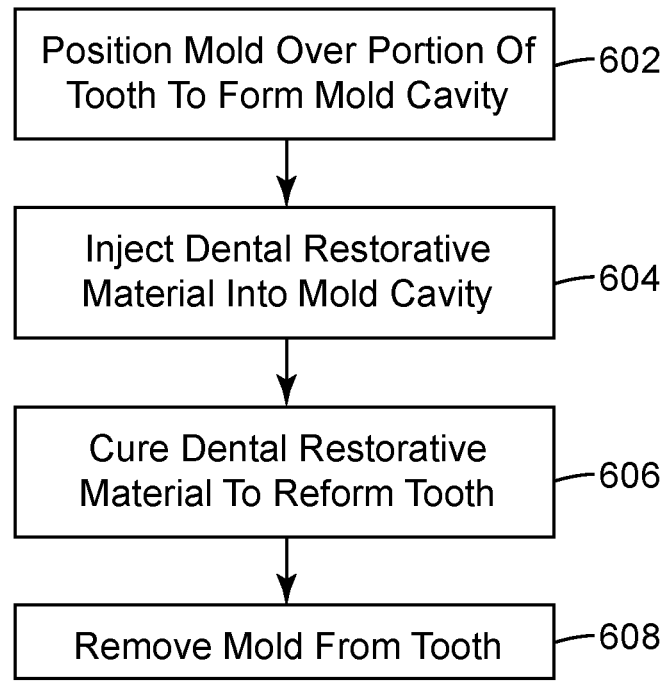
FIG. 23 is a flowchart illustrating an example technique for forming a dental restoration in a mouth of a patient.

FIG. 23 is a flowchart illustrating an example technique for forming a dental restoration in a mouth of a patient. First, a practitioner positions a mold, such as mold 10, 210, 310, 410 or 510, over a portion of a tooth of the patient (602). The mold combines with the tooth to form a mold cavity encompassing missing tooth structure of the tooth. Next a practitioner injects a dental restorative material within the mold cavity (604). The practitioner allows the dental restorative material to cure within the mold cavity to reform the tooth, which may include application of actinic radiation to cure the dental restorative material (606). Finally, the practitioner removes the mold from the tooth of the patient leaving the dental restoration with a shape defined by the mold cavity on the tooth of the patient (608).

Various examples have been described. Modifications to the described examples may be made within the spirit of this disclosure. For example, custom tools can be fabricated off of initial tooth geometry or digitally optimized tooth geometry (e.g. pulling and scaling data from tooth libraries, testing in a virtual articulator). Tools can be printed or milled. Tools can be made from the full range of 3D printed materials (strength, flexibility, translucency, color). Tools can contain features to indicate or define fill level of different restorative materials (shade, fill level, physical properties). Tools/mold sections can interlock with each other or with standard components (e.g. matrix bands). Tools can be used inside or outside of the mouth. Tools can be degradable (e.g. solvent/heat) to release from the restorative material or enable undercut geometries/reduce parting lines. Tools could be collapsible (deflated, frangible, etc.) Kits can be created of the patient specific tools and associated products and quantities, (e.g. adhesives, filling, and polishing materials selected for the patient needs and/or doctor preferences). Series of tools used sequentially in the direct filling process in order to control the geometries of multiple layers of a dental restoration on a tooth. Dental scans may be taken at diagnostic appointment to facilitate custom tools fabrication prior to a filling appointment. Tools may be manufactured locally or digital scan data may be sent to a remote location for production.

These and other examples are within the scope of the following claims.

What is claimed is:

1. A custom tool for forming a dental restoration in a mouth of a patient, the custom tool comprising:
    a mold body providing for a customized fit with at least a particular tooth of the patient, the mold body including a facial portion forming a facial surface corresponding with a facial surface of the particular tooth, a lingual portion forming a lingual surface corresponding with a lingual surface of the particular tooth, and an incisal portion forming an incisal surface corresponding with an incisal surface of the particular tooth, wherein the facial portion, the incisal portion, and the lingual portions are separable from and engageable with each other, and
    wherein the mold body is configured to combine with the particular tooth to form a mold cavity encompassing missing tooth structure of the particular tooth.

2. The custom tool of claim 1, wherein the custom tool forms a gingival surface corresponding with gingiva surrounding the particular tooth, and wherein the custom tool retracts the gingiva from the particular tooth for a restoration of the particular tooth.

3. The custom tool of claim 1, wherein the facial portion and lingual portion isolate the particular tooth from blood or saliva.

4. The custom tool of claim 1, further including a feature for indicating or defining a fill level of a dental restorative material for the particular tooth.

5. The custom tool of claim 1, wherein the facial surface, incisal surface, and the lingual surface together form an inner surface corresponding to the particular tooth's outer surface prior to restoration.

6. The custom tool of claim 1, further comprising a dental restorative material located within the mold cavity.

7. The custom tool of claim 1, wherein the custom tool further comprises a gingival surface corresponding with gingiva surrounding the tooth.

8. A custom tool for forming a dental restoration in a mouth of a patient, the custom tool comprising:
    a mold body providing for a customized fit with at least a particular tooth of the patient, the mold body including a facial portion forming a facial surface corresponding with a facial surface of the particular tooth, a lingual portion forming a lingual surface corresponding with a lingual surface of the particular tooth, and an incisal portion forming an incisal surface corresponding with an incisal surface of the particular tooth, wherein the facial portion, the incisal portion, and the lingual portions are separable from and engageable with each other,
    a custom-located element, the location of the element being selected on the basis of optical scan data, the element selected from a group consisting of:
        a parting line;
        an injection port;
        a vent;
        a gate; and a boundary line,
    wherein the mold body is configured to combine with the particular tooth to form a mold cavity encompassing missing tooth structure of the particular tooth.

9. The custom tool of claim 8, wherein the custom-located element facilitates assembly of the portions within the mouth of the patient and/or to ensures access to the mold cavity with an injection port or a vent.

* * * * *

UNITED STATES PATENT AND TRADEMARK OFFICE
CERTIFICATE OF CORRECTION

PATENT NO. : 11,571,284 B2  
APPLICATION NO. : 16/902644  
DATED : February 7, 2023  
INVENTOR(S) : James Douglas Hansen et al.

Page 1 of 1

It is certified that error appears in the above-identified patent and that said Letters Patent is hereby corrected as shown below:

In the Claims

Column 18  
Line 43, In Claim 9, delete "patient and/or to ensures" and insert -- patient and/or ensures --, therefor.

Signed and Sealed this
Eighteenth Day of July, 2023

Katherine Kelly Vidal  
*Director of the United States Patent and Trademark Office*